(12) United States Patent
Sheth et al.

(10) Patent No.: US 12,198,034 B2
(45) Date of Patent: Jan. 14, 2025

(54) HARDWARE IMPLEMENTATION OF WINDOWED OPERATIONS IN THREE OR MORE DIMENSIONS

(71) Applicant: Imagination Technologies Limited, Kings Langley (GB)

(72) Inventors: Ivaxi Sheth, Hertfordshire (GB); Aria Ahmadi, Hertfordshire (GB); James Imber, Hertfordshire (GB); Cagatay Dikici, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 529 days.

(21) Appl. No.: 17/481,588

(22) Filed: Sep. 22, 2021

(65) Prior Publication Data

US 2022/0101102 A1 Mar. 31, 2022

(30) Foreign Application Priority Data

Sep. 22, 2020 (GB) .................................. 2014932

(51) Int. Cl.
*G06N 3/045* (2023.01)
*G06N 3/08* (2023.01)
*G06T 1/20* (2006.01)

(52) U.S. Cl.
CPC .............. *G06N 3/045* (2023.01); *G06N 3/08* (2013.01); *G06T 1/20* (2013.01)

(58) Field of Classification Search
CPC .......... G06N 3/045; G06N 3/08; G06N 3/063; G06N 3/10; G06T 1/20; G06F 17/153; G06F 7/76
See application file for complete search history.

(56) References Cited

U.S. PATENT DOCUMENTS

| 10,310,768 | B1 | 6/2019 | Gauria et al. |
| 11,501,145 | B1 * | 11/2022 | Huynh ..................... G06N 3/02 |
| 11,687,762 | B2 * | 6/2023 | Singh ..................... G06N 20/00 |
| | | | 706/15 |

(Continued)

FOREIGN PATENT DOCUMENTS

| CN | 107403117 A | 11/2017 |
| CN | 111368941 A | 7/2020 |

(Continued)

OTHER PUBLICATIONS

Kiningham et al. , Design and Analysis of a Hardware CNN Accelerator, 2017 (Year: 2017).*

(Continued)

*Primary Examiner* — Mohammad K Islam
(74) *Attorney, Agent, or Firm* — Potomac Law Group, PLLC; Vincent M DeLuca

(57) ABSTRACT

A data processing system and method are disclosed, for implementing a windowed operation in at least three traversed dimensions. The data processing system maps the windowed operation in at least three traversed dimensions to a plurality of constituent windowed operations in two traversed dimensions. This plurality of 2-D windowed operations is implemented as such in at least one hardware accelerator. The data processing system assembles the results of the constituent 2-D windowed operations to produce the result of the windowed operation in at least three traversed dimensions.

16 Claims, 13 Drawing Sheets

(56) References Cited

U.S. PATENT DOCUMENTS

| | | | |
|---|---|---|---|
| 2015/0178246 A1* | 6/2015 | Herrero Abellanas | G06V 10/82 708/300 |
| 2018/0157962 A1 | 6/2018 | Henry et al. | |
| 2018/0253635 A1* | 9/2018 | Park | G06N 3/045 |
| 2019/0205780 A1 | 7/2019 | Sakaguchi | |
| 2019/0266479 A1* | 8/2019 | Singh | G06N 3/0464 |
| 2019/0325605 A1* | 10/2019 | Ye | G06F 18/2431 |
| 2019/0373264 A1* | 12/2019 | Chong | H04N 19/91 |
| 2020/0234124 A1* | 7/2020 | Park | G06N 3/048 |
| 2021/0049463 A1* | 2/2021 | Ruff | G06N 3/04 |
| 2021/0097375 A1* | 4/2021 | Huynh | G06F 7/523 |

FOREIGN PATENT DOCUMENTS

| | | |
|---|---|---|
| EP | 3242254 A1 | 11/2017 |
| GB | 2572051 A | 9/2019 |
| WO | 2018005030 A1 | 1/2018 |
| WO | 2019150067 A2 | 8/2019 |
| WO | 2021034486 A1 | 2/2021 |

OTHER PUBLICATIONS

Zhang et al. ,Optimizing FPGA-based Accelerator Design for Deep Convolutional Neural Networks (Year: 2014).*

Fan et al., "F-E3D: FPGA-Based Acceleration of an Efficient 3D Convolutional Neural Network for Human Action Recognition," 2019 IEEE 30th International Conference on Application-specific Systems, Architectures and Processors (ASAP), Jul. 15-17, 2019.

Liu et al., "A Uniform Architecture Design for Accelerating 2D and 3D CNNs on FPGAs," Electronics 2019, 8, 65; doi:10.3390/electronics8010065, Jan. 7, 2019.

Shen et al., "Towards a Uniform Template-based Architecture for Accelerating 2D and 3D CNNs on FPGA," Research Gate Conference Paper Feb. 2018.

Fan et al.; "F-C3D: FPGA-based 3-Dimensional Convolutional Neural Network"; 2017 27th International Conference on Field Programmable Logic and Applications; Sep. 4, 2017; pp. 1-4.

* cited by examiner

HARDWARE IMPLEMENTATION OF WINDOWED OPERATIONS IN THREE OR MORE DIMENSIONS

BACKGROUND

Windowed operations such as 2-D convolution and pooling are well understood and widely used in the context of neural networks—in particular, convolutional neural networks (CNNs). These 2-D operations support the application of neural network-based algorithms to image-processing/-analysis/-understanding tasks, for example. Hardware accelerators are known in the art, which are optimised for performing these 2-D operations.

The tensors used in CNNs that process 2-D images typically have a greater number of dimensions than two. Additional dimensions are added by the number of input channels associated with each image, the number of filters to be applied to each channel, etc. An exemplary tensor has four dimensions: batch, channel, height, and width. A corresponding 2-D convolution kernel to be applied to this tensor also has four dimensions: number of output channels, number of input channels, kernel height, and kernel width.

It is important to note that, irrespective of the number of dimensions of the tensor that represents a 2-D signal, the windowed operation performed (for example, convolution or pooling) is fundamentally two-dimensional. That is, the window (e.g. kernel) is only shifted over strides in two dimensions—namely, the height and width dimensions. We say that these two dimensions are "traversed" by the window. Other dimensions, such as batch and channel dimensions, may also be present.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A data processing system and method are disclosed, for implementing a windowed operation in at least three traversed dimensions. The data processing system maps the windowed operation in at least three traversed dimensions to a plurality of constituent windowed operations in two traversed dimensions. This plurality of 2-D windowed operations is implemented as such in one or more hardware accelerators. The data processing system assembles the results of the constituent 2-D windowed operations to produce the result of the windowed operation in at least three traversed dimensions.

According to an aspect, there is provided a method of implementing a windowed operation in at least three traversed dimensions, according to claim 1.

The windowed operation is implemented at least partially in hardware, in that the 2-D windowed operations are implemented in the at least one hardware accelerator. The at least one hardware accelerator may comprise circuitry configured to perform 2-D windowed operations. The step of assembling the partial results may be implemented in software (for example by a call to general purpose programmable circuitry) or in hardware (for example, by the at least one hardware accelerator).

The step of assembling the partial results may comprise at least one or any combination of two or more of: collecting some or all of the partial results, combining some or all of the partial results, and concatenating some or all of the partial results. Concatenating partial results may comprise concatenating them into a single tensor—in particular, concatenating them into a single tensor of higher dimensionality. Combining partial results may comprise element-wise combination, which does not increase the dimensionality. For example, partial results may be combined by an element-wise sum, min, max, or mean operation. Collecting partial results may comprise collecting them in a memory, or collecting them and passing them on for further processing—for example, collecting them and passing them directly to a subsequent windowed operation. The manner in which the partial results are assembled typically depends on the windowed operation being implemented. In particular, it may depend on the kind of windowed operation and the size of the window.

The data comprises a plurality of elements in the at least three traversed dimensions. Other dimensions, such as batch and channels, may also be present, in addition to the traversed dimensions. The data may also be referred to as a data tensor. When the windowed operation is a convolution, the kernel may comprise a plurality of weights (coefficients) in the at least three dimensions. The kernel may comprise multiple filters, wherein each filter operates separately on the data.

The at least three traversed dimensions may for example comprise two spatial dimensions, optionally three spatial dimensions. In one example, they may comprise or consist of two spatial dimensions and one temporal dimension. Other examples are possible. Other dimensions may be traversed, including but not limited to one or more frequency dimensions, such as spatial frequency or temporal frequency.

The windowed operation is defined by a window, which may have a size of at least one, or at least two, in each of the three traversed dimensions. The data may have a size of at least one, at least two or at least three in each of the three traversed dimensions. (All permutations and combinations of these sizes are hereby disclosed.)

Here, a slice refers to a subset of the data (or window) having a reduced size in at least one dimension, but containing the full extent of the data (or window) in the other dimensions. For example, a 2-D slice of 3-D data reduces the size of the data in one dimension. A 2-D slice of 4-D data reduces the size of the data in two dimensions. In the present method, each slice may be a 2-D slice. A tensor may be considered as an array with multiple dimensions. A "slice" of a tensor is also a tensor, containing all elements of the original tensor that correspond to one or more specified indices. For example, if a tensor T has three dimensions, then a slice U of T taken on the second dimension with index 5 may be given by: U[a,c]=T[a,5,c] for all a in {1 . . . A} and all c in {1 . . . C}, where A is the size of the first dimension and C is the size of the third dimension. We say in this case that U is a 2-D slice of a 3-D tensor T. In general, a slice may be taken on any of one or more dimensions.

Typically, the slice does not extend at all in the dimension that is reduced. In other words, it has a size of one in that dimension. In this case, a 2-D slice contains the full extent of the data in two dimensions (which are the dimensions traversed by the shifts in each 2-D windowed operation) and does not extend in the other dimensions traversed by the shifts of the windowed operation.

In substituting a plurality of constituent 2-D windowed operations for the windowed operation in three or more traversed dimensions, the plurality of constituent 2-D windowed operations may comprise two or more 2-D windowed operations for each shift of the window in the remaining dimension(s) (that is, the dimension(s) of the at least three traversed dimensions other than the two dimensions of the 2-D windowed operation). Assembling the partial results may then comprise or consist of combining the partial results of the two or more 2-D windowed operations, for each shift of the window in the remaining dimension(s).

In general, a mathematical operator underlying the windowed operation is associative, meaning that the result does not depend on how the data is grouped together to perform the windowed operation, and commutative, meaning that the order in which operations are performed may be changed. In the case of convolution or mean-pooling, the underlying mathematical operator is addition; in the case of max-pooling or min-pooling, the underlying mathematical operator is a maximum or minimum operator, for example.

The at least one hardware accelerator may be a fixed-function hardware accelerator. "Fixed-function" in this context refers to the property of the hardware that the logic it implements cannot be reconfigured after manufacture (or at least cannot be reconfigured extensively). This is in contrast to field programmable logic, for example, which is reconfigurable. The at least one hardware accelerator may be comprised in an application specific integrated circuit (ASIC). The behaviour of fixed-function hardware may be programmable.

The windowed operation in at least three traversed dimensions may be defined by a computational graph, and the mapping may comprise redrawing the computational graph to unroll/expand the windowed operation into the plurality of constituent 2-D windowed operations.

In each 2-D windowed operation, the complete 2-D windowed operation may be carried out in a single pass on a hardware accelerator configured to implement 2-D windowed operations. In this context, a "pass" entails a unit of work comprising one or more operations for the hardware accelerator to execute. The operations that can be performed together in a single pass depend on the architecture of the hardware accelerator. For example, the hardware accelerator in FIG. 10 can process a chain of operations such as 2D convolution, bias addition and pooling in a single pass. A single pass may require multiple hardware instructions and multiple memory accesses to complete.

The method may comprise comprising selecting two dimensions of the at least three traversed dimensions and mapping the windowed operation to a plurality of constituent 2-D windowed operations in the selected two dimensions.

This may comprise, for example, selecting the two dimensions with the largest number of shifts of the window. This will tend to minimise the burden on the assembling step (since the number of partial results and assembly operations will be lower than with other choices of the dimensions) and minimise the number of 2-D windowed operation hardware passes required.

The method may further comprise, when implementing one of the plurality of 2-D windowed operations in the at least one hardware accelerator, storing at least a part of the slice of the data or at least a part of the slice of the window in a local memory of the at least one hardware accelerator, and when subsequently implementing another one of the plurality of 2-D windowed operations in the at least one hardware accelerator, reusing the stored part.

When the windowed operation is a convolution operation, the slice of the window may be a slice of the convolution kernel.

The windowed operation may be a convolution operation, wherein each of the 2-D windowed operations is a 2-D convolution operation, and wherein assembling the partial results comprises combining the partial results by summing the partial results.

In some examples, the windowed operation may be a transposed convolution operation (sometimes called a "deconvolution" or fractionally strided convolution, in the neural network literature). Such operations may be used, for example, for up-sampling of data. In other examples, the windowed operation may be a grouped convolution, in which groups of the channels of the input data tensor are processed separately.

The assembling may be done at least in part by a component of the hardware accelerator configured to perform elementwise operations on tensors.

The windowed operation may be performed as part of a neural network comprising a plurality of layers, the method comprising: identifying, in the plurality of layers, windowed operations in at least three traversed dimensions, which are not supported by the at least one hardware accelerator; mapping the neural network to a restructured neural network; and implementing the restructured neural network by the at least one hardware accelerator, wherein the identified windowed operations in the neural network are replaced in the restructured neural network with a plurality of 2-D windowed operations producing partial results and a plurality of elementwise operations that combine the partial results.

In the neural network, the windowed operation may be used in any one of a variety of useful tasks, operating on 3-D (or higher dimensional) data. When the input data comprises video data (comprising two spatial dimensions and one temporal dimension) the task may comprise an analysis or classification task such as spatiotemporal segmentation, object recognition, gesture or action recognition, emotion recognition, or video event classification; or a task such as video compression. When the input data comprises volumetric data (comprising three spatial dimensions), the task may comprise an analysis or classification task such as 3-D segmentation or 3-D object recognition; or a task such as 3-D volumetric data compression. If the input data comprises 4-D data comprising three spatial dimensions and one temporal dimension, the task may comprise an analysis or classification task such as 3-D spatiotemporal segmentation, 3-D object/action/gesture/emotion recognition, or 3-D event classification; or data compression of the 4-D data. The windowed operation may also be used for restoration, denoising, enhancement, frame interpolation or super-resolution, on data in three or more dimensions, including but not limited to video data, 4-D data comprising three spatial and one temporal dimension. Data having two spatial dimensions is not limited to natural image data—it may include depth/ranging data, such as produced by RADAR, LiDAR, or acoustic sensors, for example. 3-D data may be formed by adding a temporal dimension to such data. Any of the tasks described above as being carried out on video data may be usefully performed on a 3-D dataset of time varying ranging images.

Also provided is a data processing system for implementing a windowed operation in at least three traversed dimensions, according to claim 9.

The data may comprise one of the following, or a derivative thereof: video data comprising two spatial dimensions and one temporal dimension; and volumetric data, comprising three spatial dimensions.

The data processing system may be embodied in hardware on an integrated circuit. In some embodiments, the data processing system may be part of a Neural Network Accelerator (NNA). In other embodiments, an NNA may form part of the data processing system.

The assembly unit may be implemented in the at least one hardware accelerator. In particular, the at least one hardware accelerator may comprise an element-wise operations module configured to combine the partial results. The assembly unit may be configured to concatenate partial results by writing them to memory arranged as a single tensor.

Alternatively, in some other examples, the assembly unit may be implemented in general-purpose programmable circuitry. The general-purpose programmable circuitry may comprise a CPU, for example.

The at least one hardware accelerator may comprise any one, or any combination of two or more of: one or more convolution engines, comprising circuitry configured to perform convolution calculations; a pooling unit, comprising circuitry configured to perform a pooling operation; an element-wise operations module, comprising circuitry configured to perform element-wise operations on the elements of two or more tensors; and an activation unit, comprising circuitry configured to implement an activation function of a neural network layer.

Each of these components may comprise separate, dedicated circuitry. In some embodiments, the at least one hardware accelerator may comprise or consist of an NNA, for example. The at least one hardware accelerator may be a fixed-function hardware accelerator, as summarised already above.

A neural network may comprise a layer comprising a first such windowed operation in at least three traversed dimensions, and another layer comprising a second such windowed operation in at least three traversed dimensions, wherein the transformation unit is configured to map the neural network to a restructured neural network, in which the first windowed operation is mapped to the first plurality of constituent 2-D windowed operations, and the second windowed operation is mapped to a second plurality of constituent 2-D windowed operations. The at least one hardware accelerator may be further configured to implement the second plurality of constituent 2-D windowed operations.

Each of the second plurality of constituent 2-D windowed operations may produce a respective second partial result, wherein the assembly unit is configured to assemble the second partial results to produce the result of the second windowed operation. The at least one hardware accelerator may comprise an element-wise operations module configured to combine some or all of the second partial results as appropriate.

The transformation unit may be configured to, when mapping the neural network to the restructured neural network, identify that the first windowed operation and the second windowed operation are not supported by the at least one hardware accelerator, and in response, map them respectively to the first plurality and the second plurality of constituent 2-D windowed operations. The transformation unit may be configured to map each of the first and second windowed operations such that it is replaced in the restructured neural network with a plurality of 2-D windowed operations producing partial results and a plurality of elementwise operations that combine the partial results.

The windowed operation may be a convolution operation, wherein each of the 2-D windowed operations is a 2-D convolution operation, and wherein the assembly unit is configured to combine the partial results by summing them.

The windowed operation may be a maximum operation, wherein each of the 2-D windowed operations is a maximum operation, and wherein the assembly unit is configured to combine the partial results by identifying the maximum among them.

The windowed operation may be a minimum operation, wherein each of the 2-D windowed operations is a minimum operation, and wherein the assembly unit is configured to combine the partial results by identifying the minimum among the partial results.

The windowed operation may be a mean pooling operation, wherein each of the 2-D windowed operations is a mean pooling operation, and wherein the assembly unit is configured to combine the partial results by calculating the mean of the partial results.

The windowed operation may include a bias addition operation, wherein the transformation unit is configured map the bias addition to a selected one of the 2-D windowed operations, wherein the bias addition is performed in the at least one hardware accelerator as part of the selected 2-D windowed operation.

The data processing system may further comprise a zero-padding optimisation unit, and the data may comprise zero-padded data, wherein the zero-padding optimisation unit is configured to exclude from the plurality of constituent 2-D windowed operations a 2-D windowed operation that would be applied to a slice of the zero-padded data that consists solely of zeros. The zero-padding optimisation unit may be part of the transformation unit.

The data processing system may further comprise a memory, wherein the data processing system is configured, when implementing one of the plurality of 2-D windowed operations in the at least one hardware accelerator, to store at least a part of the slice of the data or at least a part of the slice of the window in the memory, and when subsequently implementing another one of the plurality of 2-D windowed operations in the at least one hardware accelerator, to reuse the stored part.

The part is thus stored during one 2-D windowed operation and reused in a later 2-D windowed operation. The stored part may be retrieved from the memory rather than needing to be retrieved from an external memory. This can help to reduce the memory access bandwidth to external memory. Read operations from external memory may be costly, in terms of time and/or power consumption, in many hardware architectures. Therefore, it is advantageous to reduce the number of read operations from external memory, where possible.

The memory may be a local memory—for example, implemented on the same semiconductor die as the hardware accelerator, transformation unit, and assembly unit.

Storing (caching) part of the data may be advantageous, in particular, if the stride of the window in at least one remaining dimension (other than the two dimensions of the 2-D windowed operations) is less than the size of the window in that remaining dimension. In this case, different slices of the window will be applied to the same data elements in different 2-D windowed operations.

The at least one hardware accelerator may comprise a plurality of convolution engines, each configured to perform a convolution calculation, and each comprising a plurality of elements of multiply logic and a plurality of elements of addition logic; and a plurality of accumulators, each configured to perform an accumulation calculation on convolution results output by the convolution engines, wherein the convolution engines and accumulators are configured to perform a 2-D convolution operation.

Also disclosed is a neural network accelerator, hereinafter NNA, configured to perform a method as summarised above or the method of any of claims 1 to 8.

Also disclosed is a method of manufacturing, using an integrated circuit manufacturing system, a data processing system as summarised above or as claimed in any of claims 9 to 16, or an NNA as summarised above.

Also provided is a method of manufacturing, using an integrated circuit manufacturing system, a data processing system or NNA as summarised above, the method comprising: processing, using a layout processing system, a computer readable description of the data processing system or NNA so as to generate a circuit layout description of an integrated circuit embodying the data processing system or NNA; and manufacturing, using an integrated circuit generation system, the data processing system or NNA according to the circuit layout description.

Also provided is computer readable code configured to cause a method as summarised above or the method of any of claims 1 to 8 to be performed when the code is run. There is also provided a computer readable storage medium having encoded thereon said computer readable code.

There may be provided computer program code for performing any of the methods described herein. There may be provided non-transitory computer readable storage medium having stored thereon computer readable instructions that, when executed at a computer system, cause the computer system to perform any of the methods described herein.

Also provided is an integrated circuit definition dataset that, when processed in an integrated circuit manufacturing system, configures the integrated circuit manufacturing system to manufacture a data processing system or NNA as summarised above or claimed in any of claims 9 to 16.

Additionally provided is a non-transitory computer readable storage medium having stored thereon a computer readable description of a data processing system or NNA as summarised above or claimed in any of claims 9 to 16 that, when processed in an integrated circuit manufacturing system, causes the integrated circuit manufacturing system to manufacture an integrated circuit embodying the data processing system or NNA.

Also provided is a non-transitory computer readable storage medium having stored thereon a computer readable description of a data processing system or NNA as summarised above or claimed in any of claims 9 to 16 which, when processed in an integrated circuit manufacturing system, causes the integrated circuit manufacturing system to: process, using a layout processing system, the computer readable description of the data processing system or NNA so as to generate a circuit layout description of an integrated circuit embodying the data processing system or NNA; and manufacture, using an integrated circuit generation system, the data processing system or NNA according to the circuit layout description.

Also provided is an integrated circuit manufacturing system configured to manufacture a data processing system or NNA as summarised above or claimed in any of claims 9 to 16.

Also provided is an integrated circuit manufacturing system comprising: non-transitory computer readable storage medium having stored thereon a computer readable description of a data processing system or NNA configured to implement a windowed operation in at least three dimensions, the windowed operation comprising applying a window having at least three dimensions to data having at least three dimensions, with shifts of the window in all three dimensions; layout processing system configured to process the computer readable description so as to generate a circuit layout description of an integrated circuit embodying the data processing system or NNA; and an integrated circuit generation system configured to manufacture the data processing system or NNA according to the circuit layout description, wherein the data processing system or NNA comprises: a transformation unit, configured to map the windowed operation to a plurality of constituent 2-D windowed operations, each 2-D windowed operation comprising applying a slice of the window to a slice of the data, with shifts of the slice of the window in only two dimensions; at least one hardware accelerator, comprising circuitry configured to implement the plurality of 2-D windowed operations, each 2-D windowed operation producing a respective partial result; and an assembly unit, configured to assemble the partial results to produce the result of the windowed operation The layout processing system may be configured to determine positional information for logical components of a circuit derived from the integrated circuit description so as to generate a circuit layout description of an integrated circuit embodying the data processing system or NNA.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
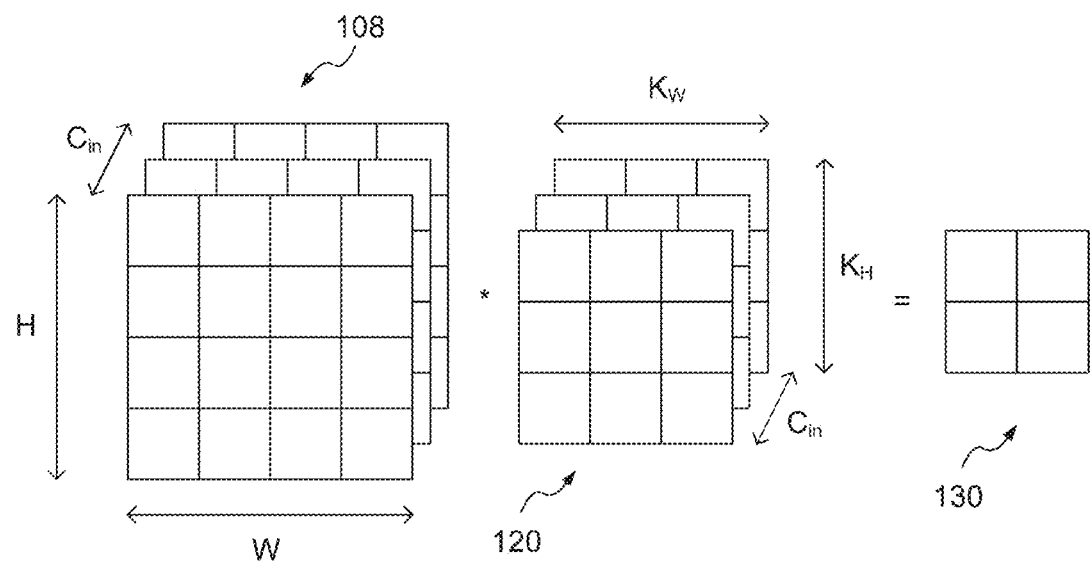
FIG. 1 illustrates a 2-D convolution operation.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

As used herein, a "windowed operation" refers to an operation in which a function is applied to different locations in a multidimensional input data tensor, according to a sliding window that strides on some or all of the dimensions (referred to as "window-traversed dimensions", or "traversed dimensions" for short). The windowed operation generates an output data tensor in correspondence with the input data tensor. The input and output data tensors may include other dimensions (for example, batch and/or channel dimensions) in addition to the dimensions traversed by the window. A windowed operation may be referred to by the number of dimensions that are traversed in the operation—for example, an "N-D" convolution is a convolution with N traversed dimensions. It will be understood that words like "traversed", "stride", "sliding" and "shift" do not place any particular limitation on the order in which data is processed. For example, a windowed operation might be implemented by sequentially performing the calculations implied by successive, incremental shifts of the window, but this is not essential. In general, the calculations could be performed in any order, including performing at least some of them in parallel with one another, if the underlying hardware permits this. Embodiments will now be described by way of example only. Most of the examples will focus on the case of multidimensional convolution. However, it will be understood that the scope of the present disclosure is not limited to convolution as the windowed operation.

2-D convolution is well understood and widely implemented. It forms the basis of convolutional neural networks (CNNs), which can be used to process and analyse data that is fundamentally two-dimensional in character. One of the most widely used applications of CNNs to 2-D data is for image processing and analysis (including image understanding, object detection and segmentation).

FIG. 1 illustrates a 2-D convolution operation on input data (an input tensor) 108 of height H and width W, which includes $C_{in}$ input channels. In the example shown in FIG. 1, $C_{in}$=3. These channels could represent the three colour channels of a colour image, for instance. Alternatively, in an intermediate layer of a neural network, the channels might represent the outputs of different filters that have operated on a preceding layer. The input data 108 is convolved with a kernel 120, having a height $K_H$ and a width $K_W$. The convolution is denoted by the asterisk (*) in FIG. 1. The kernel has the same number of channels $C_{in}$ as the input data. The 2-D convolution operation computes the following weighted sum:

$$y_{h,w} = \sum_{m \in \{0,\ldots,C_{in}-1\}} \sum_{l \in \{0,\ldots,K_H-1\}} \sum_{k \in \{0,\ldots,K_W-1\}} w_{m,l,k} x_{m,h+l,w+k}$$

Here, the weights, w, are the coefficients of the kernel. The data values are denoted by x. This calculation amounts to shifting (stepping) the kernel across the data in both the height and width dimensions and, for every shift, calculating the inner product of the kernel values with the data values in a window overlapped by the kernel. The height and width dimensions are said to be "traversed" by the kernel. The size of each shift in each dimension is known as the stride. In the example shown in FIG. 1, a stride of 1 in each dimension is assumed, for simplicity. Also for simplicity, there is no padding in this example. The data has H=4 and W=4, and the kernel has $K_H$=3 and $K_W$=3; therefore, the size of the output data 130 is 2×2.

In some examples, convolutions may be performed with a stride greater than 1 in one or both dimensions. With a stride of 2, for example, the kernel is shifted by two data elements (for example, pixels) in each step. This reduces the number of inner product calculations to be performed and reduces the size of the output correspondingly. In some examples, the input data may be padded—for example, padded with zeros. Padding allows the kernel to be centred on data elements that lie at or near the boundary of the input data, where the kernel would extend beyond the boundary. The padding provides additional data values that can be operated on by the relevant elements of the kernel, in these circumstances. This can avoid a reduction in the size of the output tensor, compared with the input tensor. Without padding, the kernel can only shift until the boundary of the kernel reaches the boundary of the data tensor. With suitable padding, and a stride of 1, for example, the size of the output in the two dimensions traversed by the kernel can be identical to the size of the input in those dimensions. Convolutions may also be dilated (also called "atrous"), meaning that rather than using contiguous input data elements on each application of the kernel, the sample locations can be spread out over a larger input region. The use of padding and strides other than 1 and dilation in 2D convolutions (and other 2D windowed operations) will be familiar known to those skilled in the art. Without loss of generality, they will therefore be ignored in much of the following description. It will be understood that everything disclosed is applicable also when suitable padding is used, to windowed operations with any stride in any traversed dimension and any dilation factor.

Figure 2:
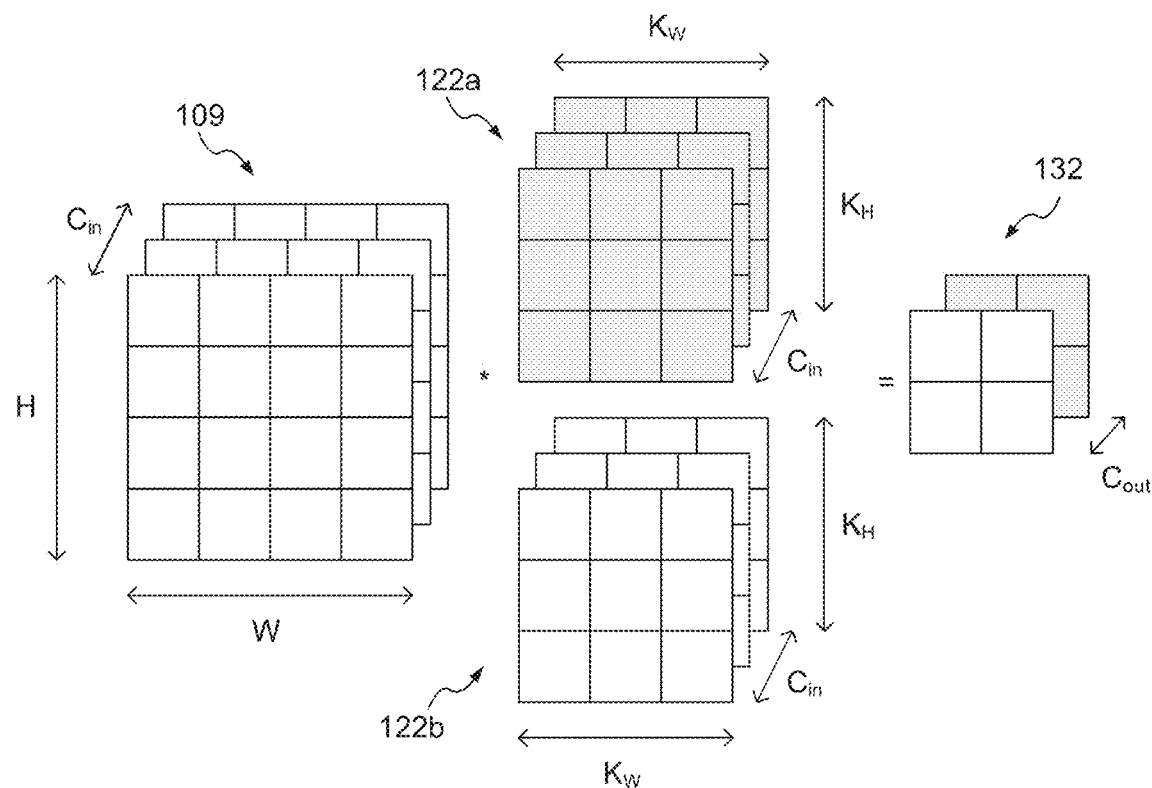
FIG. 2 illustrates a 2-D convolution operation with multiple output channels.

FIG. 2 extends the example of FIG. 1 by convolving input data 109 with a kernel comprising two filters 122a and 122b. Each filter 122a, 122b has the same size and dimensions as the kernel 120 in FIG. 1. The number of filters determines the number of output channels $C_{out}$. As shown in FIG. 2, $C_{out}$=2. The kernel is four dimensional, as shown in the drawing, with dimensions [$C_{out}$, $C_{in}$, $K_H$, $K_W$]. The input tensor 109 is still three dimensional, with dimensions [C, H, W]. The convolution calculation with the added channel dimension can be written as follows:

$$y_{c,h,w} = \sum_{m \in \{0,\ldots,C_{in}-1\}} \sum_{l \in \{0,\ldots,K_H-1\}} \sum_{k \in \{0,\ldots,K_W-1\}} w_{c,m,l,k} x_{m,h+l,w+k}$$

Again, this is simplified by ignoring stride and padding, without loss of generality. The size of the output data 132 is 2×2×2 (that is, number of output channels, height, and width, all equal to 2). Again, the height and width are referred to as the "traversed" dimensions.

There can also be an additional dimension, not shown in FIG. 2, called the batch dimension. In this case, input tensor 109 is four dimensional, with dimensions [B, C, H, W]. The convolution calculation with the added batch dimension can be written as follows:

$$y_{b,c,h,w} = \sum_{m \in \{0,...,C_{in}-1\}} \sum_{l \in \{0,...,K_H-1\}} \sum_{k \in \{0,...,K_W-1\}} w_{c,m,l,k} x_{b,m,h+l,w+k}$$

Note that, although the kernel and input tensor are four dimensional, this is still a 2-D convolution, because the kernel is shifted only in the height and width directions.

The general concept of convolution can be extended to additional traversed dimensions. For example, a new traversed dimension can be added, labelled "D" (for "depth"). The input tensor then increases from a 4-D tensor to a 5-D tensor: [B, C, D, H, W], with size D in the depth dimension. Similarly, the kernel increases to a 5-D kernel: [Cout, Cin, KD, KH, KW], with size KD in the depth dimension. An extra summation is introduced to the convolution calculation, which now includes shifts over three traversed dimensions [D, H, W]. This 3-D convolution calculation can be written as follows:

$$y_{b,c,d,h,w} = \sum_{m \in \{0,...,C_{in}-1\}} \sum_{n \in \{0,...,K_D-1\}} \sum_{l \in \{0,...,K_H-1\}} \sum_{k \in \{0,...,K_W-1\}} w_{c,m,n,l,k} x_{b,m,d+n,h+l,w+k}$$

Again stride and padding have been ignored in this simplified formula, for the purposes of clarity and simplicity, and without loss of generality. The summation over four dimensions, with every step over each of three dimensions, is a computationally intensive calculation. It is therefore desirable to implement it efficiently.

Other windowed operations typically implemented in neural networks include pooling operations, such as min-pooling, max-pooling, and average- (or mean-) pooling. Although conventionally applied as 2-D operations (with two traversed dimensions), networks may also contain pooling operations with three traversed dimensions. It would also be desirable to implement these 3-D operations efficiently. By way of example, a 2-D max-pooling operation on a 4-D input tensor [B, C, H, W] can be described by the following equation:

$$y_{b,c,h,w} = \max_{l \in \{0,...,K_H-1\}} \max_{k \in \{0,...,K_W-1\}} x_{b,c,h+l,w+k}$$

Similarly to the case for convolution, this can be extended to a 3-D max-pooling operation, on a 5-D input tensor [B,C,D,H,W], described by the following equation:

$$y_{b,c,d,h,w} = \max_{n \in \{0,...,K_D-1\}} \max_{l \in \{0,...,K_H-1\}} \max_{k \in \{0,...,K_W-1\}} x_{b,c,d+n,h+l,w+k}$$

Whereas in the 2-D max-pooling operation, there were two traversed dimensions (height and width), in the 3-D max-pooling operation there are three traversed dimensions (depth, height, and width). Corresponding equations can be written for min-pooling and mean-pooling operations traversing three dimensions. It will be noted that there are no weights in the case of max-pooling or min-pooling—therefore, there is no "kernel" in the classical sense. However, these are still windowed operations, in the present context, in the sense that they apply a multidimensional window to the input data tensor and consider only data values falling within that window to calculate a corresponding output value, for that shift of the window.

Yet another windowed operation sometimes implemented in neural networks is transposed convolution, also known as convolution transpose, deconvolution or fractionally-strided convolution. A 2-D convolution transpose applied to a 4-D input tensor [B, C, H, W] can be described by the following equation:

$$y_{b,c,h,w} = \sum_{m \in \{0,...,C_{in}-1\}} \sum_{l \in \{0,...,K_H-1\}} \sum_{k \in \{0,...,K_W-1\}} w_{c,m,l,k} x_{b,m,h-l,w-k}$$

This can be extended to a 3-D convolution transpose applied to a 5-D input tensor [B, C, D, H, W], described by the following equation:

$$y_{b,c,d,h,w} = \sum_{m \in \{0,...,C_{in}-1\}} \sum_{n \in \{0,...,K_D-1\}} \sum_{l \in \{0,...,K_H-1\}} \sum_{k \in \{0,...,K_W-1\}} w_{c,m,n,l,k} x_{b,m,d-n,h-l,w-k}$$

Fixed-function hardware accelerators, known as "Neural Network Accelerators" (NNAs), exist for neural networks. "Fixed-function" in this context refers to the property of the hardware that the logic it implements cannot be reconfigured after manufacture. This is in contrast to field programmable logic, for example, which is reconfigurable. The behaviour of fixed-function hardware may be programmable. A fixed-function hardware accelerator may, for instance, be an application-specific integrated circuit (ASIC). NNAs typically include dedicated, optimised hardware for computing 2-D operations, for example convolutions and poolings, quickly and efficiently. The inventors have recognised that existing NNA hardware specialised in 2-D windowed operations (including for example convolution and pooling operations) can be exploited to implement 3-D windowed operations efficiently. A plurality of 2-D convolutions can be structured and combined to arrive at the 3-D convolution. The following equation shows how a 3-D convolution operation can be constructed so that one of traversed dimensions (depth, in this example) comprises the outermost loop (that is, the outermost summation). The inner part of the calculation (inside the square brackets) is made up of a plurality of 2-D convolution operations like those introduced above with reference to FIG. 2.

$$y_{b,c,d,h,w} = \sum_{n \in \{0,...,K_D-1\}} \left[ \sum_{m \in \{0,...,C_{in}-1\}} \sum_{l \in \{0,...,K_H-1\}} \sum_{k \in \{0,...,K_W-1\}} w_{c,m,n,l,k} x_{b,m,d+n,h+l,w+k} \right]$$

This restructuring along one dimension, to produce a combination of constituent 2-D operations may be referred to variously as "unrolling" "unpacking" or "factoring out" that dimension. Although the depth dimension is factored out in the example above, it should be understood that the approach can be applied generally: any one of the three traversed dimensions may be selected and factored out, leaving the other two traversed dimensions as a plurality of 2-D operations in the inner part of the calculation.

Similarly, the inventors have recognised that other 3-D windowed operations can also be implemented efficiently by structuring the computation as a plurality of 2-D operations and implementing these 2-D operations using the existing NNA hardware. This applies, for example, to pooling, as discussed above. A 3-D max-pooling operation can be cast as a plurality of 2-D max-pooling operations as follows:

$$y_{b,c,d,h,w} = \max_{n \in \{0,...,K_D-1\}} \left[ \max_{l \in \{0,...,K_H-1\}} \max_{k \in \{0,...,K_W-1\}} x_{b,c,d+n,h+l,w+k} \right]$$

Again the unpacking in this example is along the depth dimension, but the same technique may equally be applied to the height or width dimension. It will be understood that a 3-D min-pooling (or 3-D mean-pooling) operation may be recast as a combination of a plurality of 2-D min-pooling operations (or 2-D mean-pooling operations, respectively) in a similar way.

Likewise, the 3-D convolution transpose operation described above can be structured as a plurality of 2-D convolution transpose operations, as follows (once again unpacking along the depth dimension, without limitation or loss of generality):

$$y_{b,c,d,h,w} =$$

$$\sum_{n \in \{0,...,K_D-1\}} \left[ \sum_{m \in \{0,...,C_{in}-1\}} \sum_{l \in \{0,...,K_H-1\}} \sum_{k \in \{0,...,K_W-1\}} w_{c,m,n,l,k} x_{b,m,d-n,h-l,w-k} \right]$$

As can be deduced from the foregoing equations, when a 3-D windowed operation is mapped to a plurality of constituent 2-D windowed operations, each of the 2-D windowed operations produces a partial result. These partial results need to be assembled to produce the result of the 3-D windowed operation. The appropriate way to assemble the partial results depends on the operation being implemented. The underlying operation in the case of convolution is addition; therefore, the partial results are combined by summing them over the unpacked dimension. In the special case that the convolution kernel has a size of 1 in the unpacked dimension (that is, when $K_D=1$ in the examples above), summation is not necessary, and the partial results are simply collected, or concatenated, at the output of the 2-D windowed operations. This would apply to convolution with a 1×1×1 kernel, for example. The underlying operation in the case of max-pooling is a maximum operator; therefore, the partial results will be assembled by combining them using a maximum operator. Likewise, for min-pooling, the partial results will be assembled by combining them using a minimum operator. In a convolution transpose operation, the partial results may be assembled by summing and optional concatenation. In certain special cases (depending on stride), the partial results of a 3-D convolution transpose may be assembled purely by collecting them—optionally, concatenating them by stacking them appropriately in the unpacked dimension to bring them together into one tensor. As previously, it will be understood that any of the traversed dimensions may be factored out instead of the depth dimension.

A neural network accelerator may include dedicated hardware for element-wise operations on tensors. Here, "element-wise" refers to a binary operation ∘ such that $$y_X = a_X \circ b_X$$

This includes elementwise summation, max and multiplication. Hardware for element-wise operations can be used to implement the combination of the partial results efficiently. For example, the partial results from a plurality of 2-D convolution operations can be combined using an element-wise addition. The partial results from a plurality of 2-D max pooling operations can be combined using an element-wise maximum; and the partial results from a plurality of 2-D min-pooling operations can be combined using an element-wise minimum.

Figure 3A:
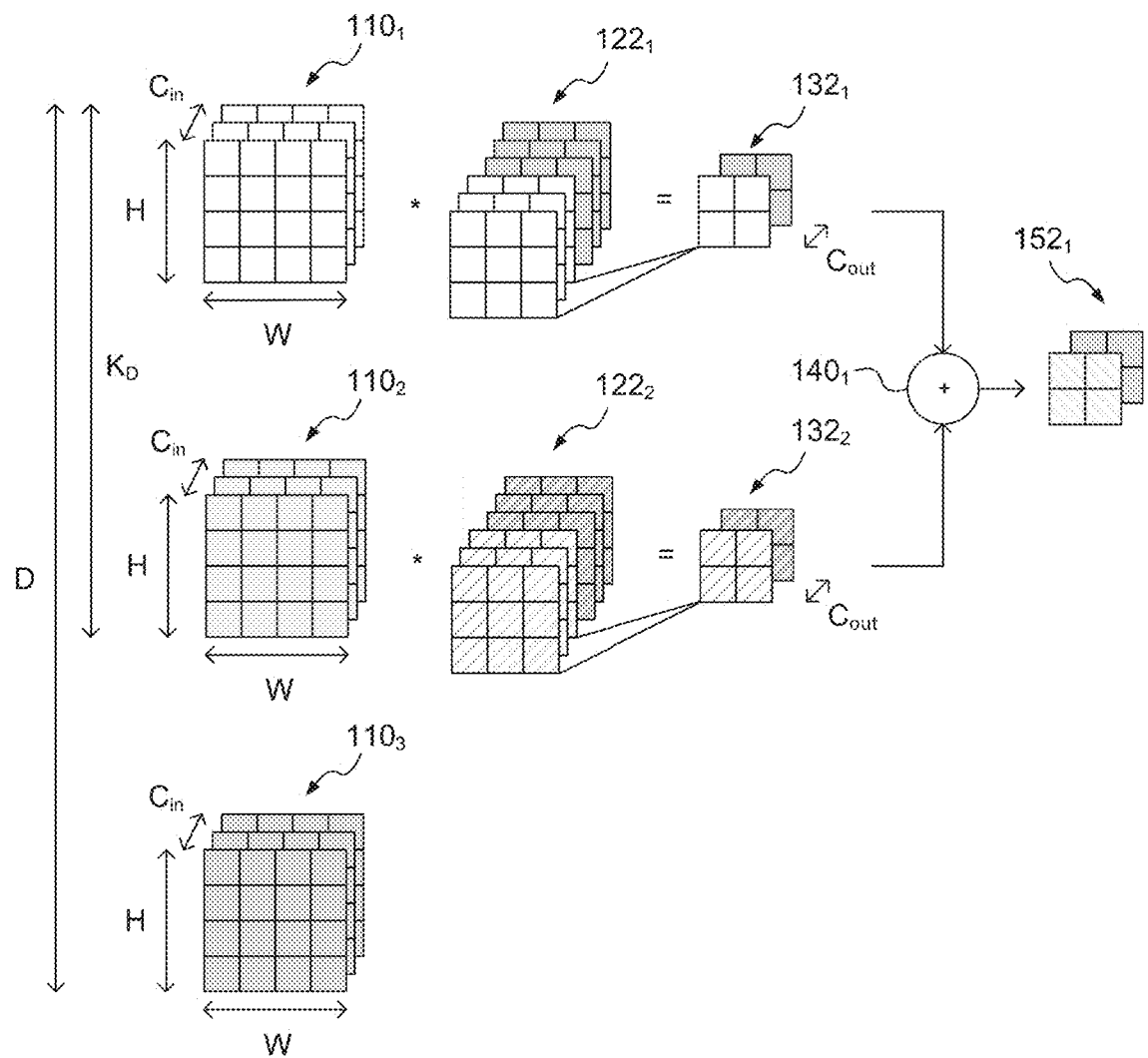
FIGS. 3A and 3B illustrate a 3-D convolution that is broken down into a plurality of 2-D convolutions, according to an example.
Figure 3B:
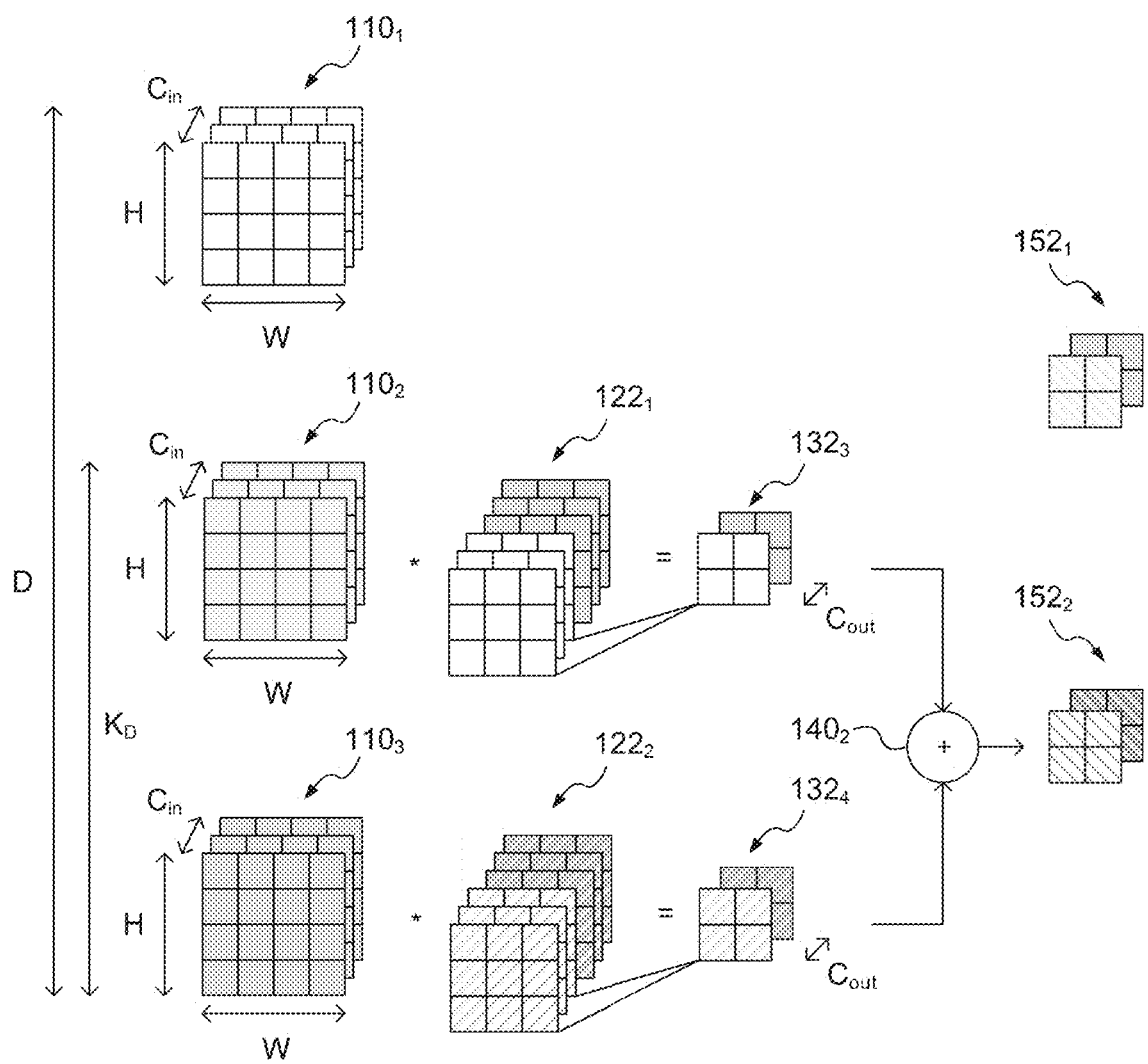

FIGS. 3A-3B show an example that extends the 2-D convolution of FIG. 2 into three dimensions, and implements the 3-D convolution operation as a set of 2-D convolutions. FIGS. 3A and 3B show an input tensor 110 which extends in the depth dimension. In this example, it has a size D=3 in this depth dimension. The data 110 is illustrated as three "slices" $110_1$-$110_3$, each slice having a size of 1 in the depth dimension. Each of these slices is equivalent to the input data 109 used in the example of FIG. 2. As in FIG. 2, the batch dimension has been suppressed. The input tensor is thus a 5-D tensor, [B, C, D, H, W]. The meaning of each of the dimensions in the convolution depends on the application. In some examples, the three traversed dimensions may be spatial dimensions [D, H, W]. In other examples, one or more traversed dimensions need not be spatial dimensions. A traversed dimension could be a temporal dimension or a temporal- or spatial-frequency dimension, for example.

The kernel is likewise a 5-D data structure [$C_{out}$, $C_{in}$, $K_D$, $K_H$, $K_W$], with $K_D=2$ in this example. It is assumed that the stride of the kernel is 1 in each of the three dimensions. The kernel is depicted as two "slices" $122_1$-$122_2$, each having size 1 in the depth dimension. Each slice is equivalent to the kernel 122 in FIG. 2. FIG. 3A shows the kernel in a first position (first shift), where the first slice $122_1$ of the kernel is aligned with the first slice $110_1$ of the input tensor and the second slice $122_2$ of the kernel is aligned with the second slice $110_2$ of the input tensor. When presented in this way, it can be seen that the calculation of the 3-D convolution, for the first shift, consists of two 2-D convolutions followed by an element-wise summation. The first slice $110_1$ of the input tensor is convolved with the first slice $122_1$ of the kernel, to produce a first partial result $132_1$. The second slice $110_2$ of the input tensor is convolved with the second slice $122_2$ of the kernel, to produce a second partial result $132_2$. (Each of these partial results is equivalent to the result 132 of the 2-D convolution in FIG. 2.) To produce the output $152_1$ of the 3-D convolution for this shift of the kernel in the depth dimension, the two partial results are summed by summation block $140_1$.

FIG. 3B shows the kernel in a second position (second shift) according to the stride of the convolution in the D dimension, where the first slice $122_1$ of the kernel is aligned with the second slice $110_2$ of the input tensor and the second slice $122_2$ of the kernel is aligned with the third slice $110_3$ of the input tensor. Again, it can be seen that the calculation of the 3-D convolution for this second shift consists of two 2-D convolutions followed by an element-wise summation.

The second slice $110_2$ of the input tensor is convolved with the first slice $122_1$ of the kernel, to produce a third partial result $132_3$. The third slice $110_3$ of the input tensor is convolved with the second slice $122_2$ of the kernel, to produce a fourth partial result $132_4$. To produce the output $152_2$ of the 3-D convolution for this shift of the kernel in the depth dimension, the two partial results $132_3$ and $132_4$ are summed by summation block $140_2$. Consequently, the full output 152 of the 3-D convolution (which has dimensions 2×2×2) can be generated by performing four 2-D convolutions followed by two element-wise summations of the partial results produced by the 2-D convolutions.

Figure 4:
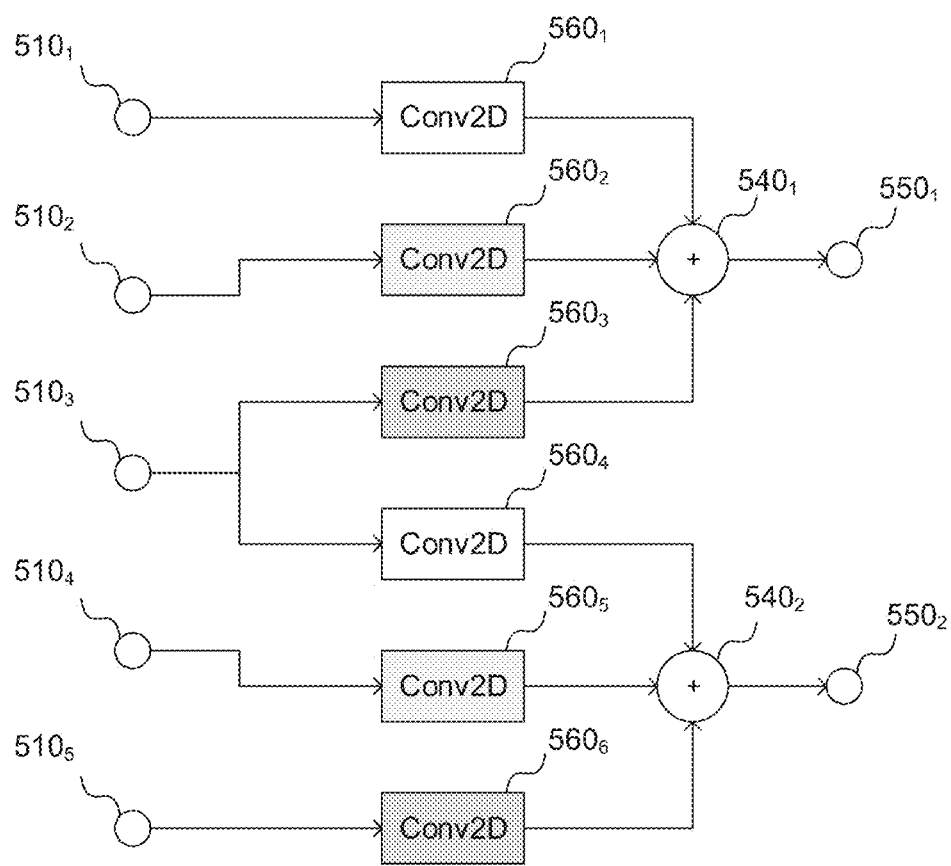
FIG. 4 shows a computational graph for implementing a 3-D convolution as a plurality of 2-D convolutions according to another example.

The restructuring of a 3-D convolution in terms of multiple 2-D convolutions can also be represented in the form of a computational graph. Neural networks may be envisaged as computational graphs; the advantage to this representation is that a 3-D convolution in a neural network can be replaced with an equivalent computational subgraph, making deployment on an NNA supporting 2-D convolutions and element-wise summations straightforward. An example of this is shown in FIG. 4. Here, the original input tensor 510 has size D=5 in the depth dimension. The input tensor 510 is illustrated as five constituent slices $510_1$-$510_5$, each slice having a size of 1 in the depth dimension. We wish to convolve this with a kernel having size $K_D$=3 in the depth dimension. In this example, the stride in the depth dimension is equal to 2. Based on these parameters, the output 550 will have a size of 2 in the depth dimension. The output 550 consists of two slices $550_1$-$550_2$. The first slice $550_1$ can be produced by performing three 2-D convolutions $560_1$-$560_3$, in which the first three slices $510_1$-$510_3$ of the input tensor are convolved with the three slices of the kernel, respectively. The outputs of these 2-D convolutions are summed element-wise, at summation block $540_1$, to produce the first slice $550_1$ of the output tensor.

The second slice $550_2$ can likewise be produced by performing three 2-D convolutions $560_4$-$560_6$, in which the last three slices $510_3$-$510_5$ of the input tensor are convolved with the three slices of the kernel, respectively. The outputs of these 2-D convolutions are summed element-wise, at summation block $540_2$, to produce the second slice $550_2$ of the output tensor. Note that the weights in the 2-D convolution $560_1$ are identical to the weights in the 2-D convolution $560_4$. In both cases, these are the weights from the first slice of the kernel. Likewise, the weights in the 2-D convolution $560_2$ are identical to the weights in the 2-D convolution $560_5$ (the second slice of the kernel); and the weights in the 2-D convolution $560_3$ are identical to the weights in the 2-D convolution $560_6$ (the third slice of the kernel). It will be appreciated that in this way the processing on the depth dimension of the original 3-D convolution has been reproduced in the topology of the computational graph.

Figure 5A:
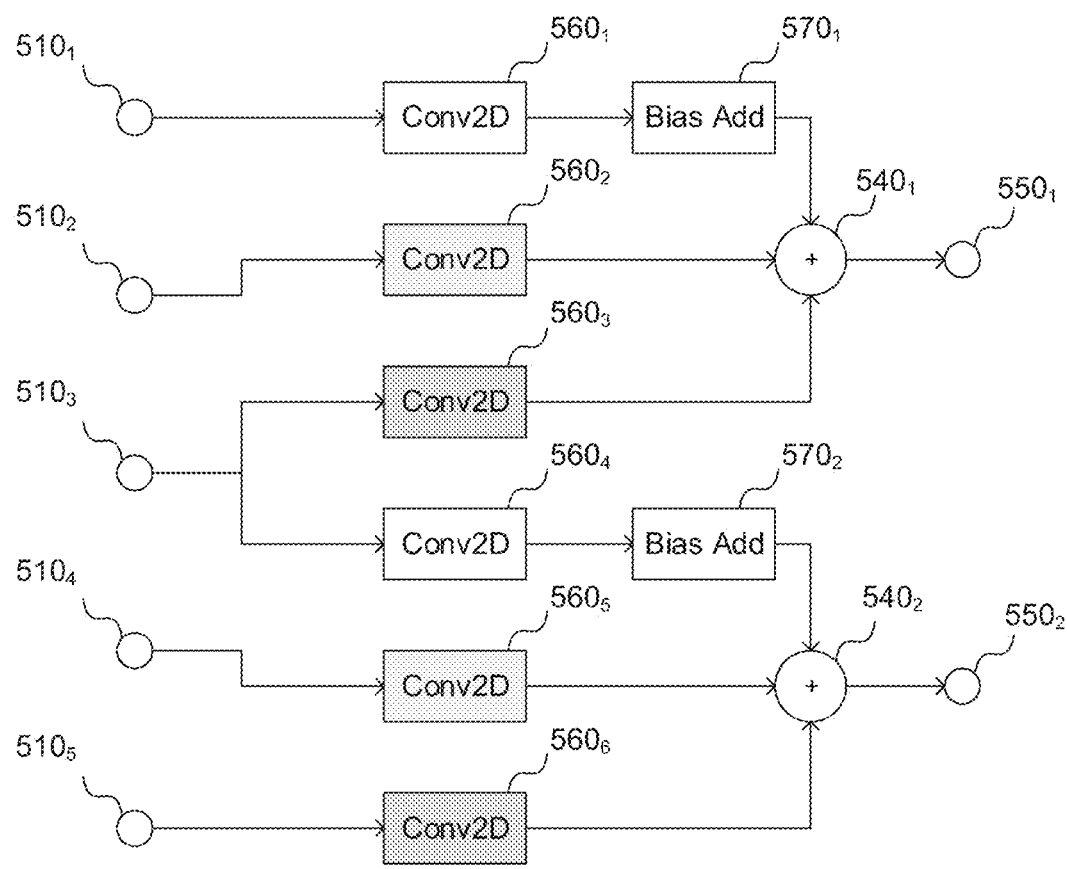
FIG. 5A shows a computational graph including bias addition.

FIG. 5A shows another example, in which the example of FIG. 4 is extended to include bias addition. Bias addition is a commonly used feature in CNNs, and it would be desirable to be able to implement it efficiently in the context of 3-D convolution. NNAs that support efficient 2-D convolution typically support bias addition as part of the 2-D convolution. The present inventors have recognised that the bias addition in a 3-D convolution can be included in one of the 2-D convolutions producing partial results for the 3-D convolution. This can enable the bias addition to be implemented efficiently by incorporating it in a single pass of a 2-D convolution function on an NNA. The bias addition can be incorporated in any one of the 2-D convolutions that go into producing a single output slice of the 3-D convolution. This can be seen in the computational graph of FIG. 5A.

Bias addition $570_1$ is included at the output of the convolution $560_1$ and bias addition $570_2$ is likewise incorporated at the output of the convolution $560_4$. The convolution weights and biases are the same in both cases.

Equivalent diagrams to those of FIGS. 3-4 can be drawn for other 3-D windowed operations, such as pooling. If the 3-D convolution were replaced with a 3-D max-pooling operation, for example, then the 2-D convolutions of FIGS. 3-4 would be replaced with 2-D max-pooling operations and the element-wise addition operations of FIGS. 3-4 would be replaced with element-wise maximum operations.

Figure 5B:
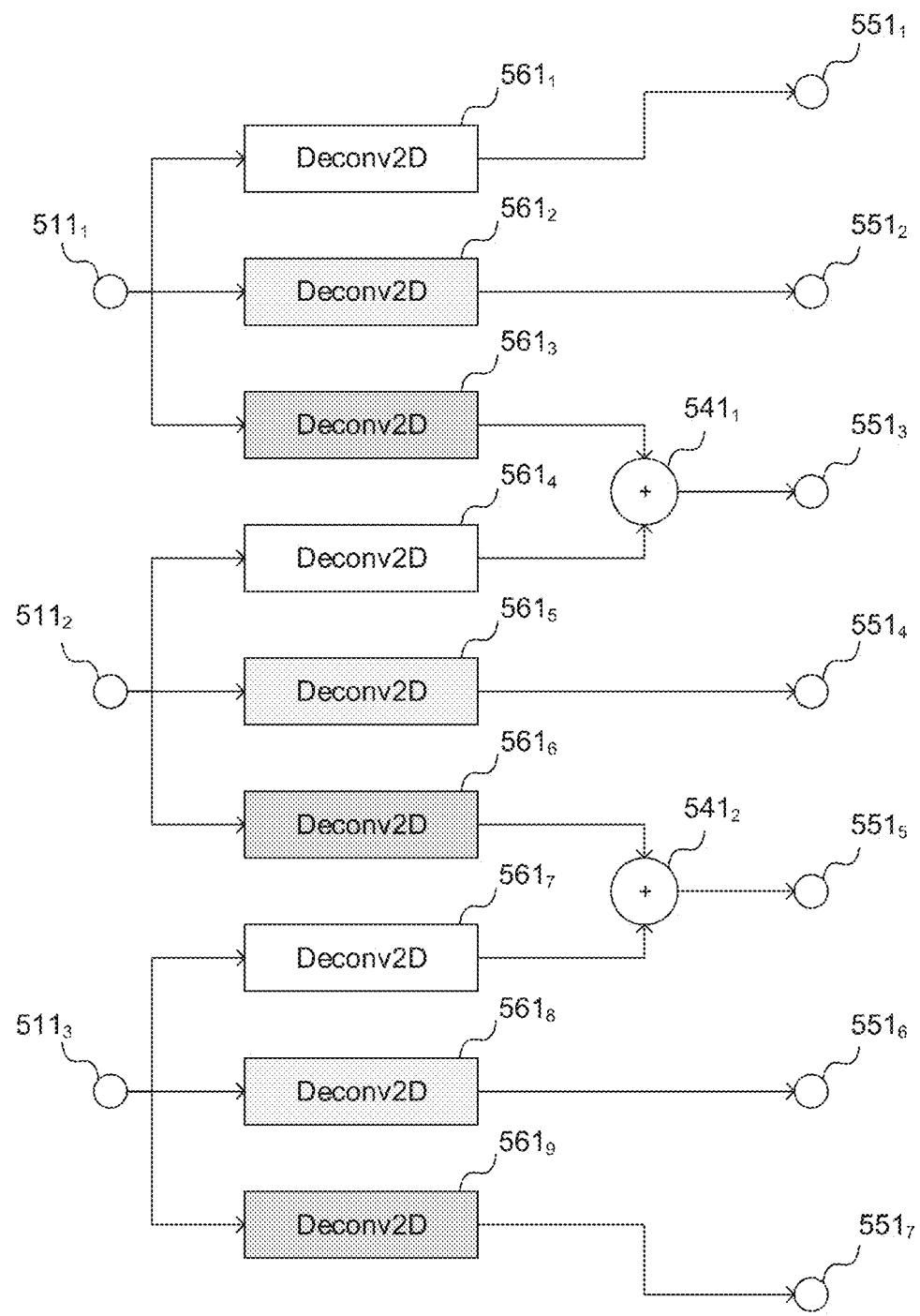
FIG. 5B shows a computational graph for implementing a 3-D convolution transpose.

FIG. 5B shows another example of a computational graph, this time for a 3-D convolution transpose. The 3-D convolution transpose is structured as a plurality of 2-D convolution transpose operations, as explained previously above. The original input tensor 511 has size D=3 in the depth dimension. It is illustrated as three constituent slices $511_1$-$511_3$, each slice having a size of 1 in the depth dimension. The kernel has size $K_D$=3 in the depth dimension. In this example, the stride in the depth dimension is 2. Based on these parameters, the output 551 will have a size of 7 in the depth dimension. The output 551 consists of seven slices $551_1$-$551_7$. The first slice $551_1$ and second slice $551_2$ can be produced by performing 2-D deconvolutions $561_1$-$561_2$, respectively, on the first slice $511_1$ of the input tensor. The third slice $551_3$ is produced by performing two 2-D deconvolutions $561_3$-$561_4$, respectively, on the first and second slices $511_1$-$511_2$ of the input tensor, and summing the results element-wise, at summation block $541_1$. The fourth slice $551_4$ is produced by performing a 2-D deconvolution $561_5$ on the second slice $511_2$ of the input tensor. The fifth slice $551_5$ is produced by performing two 2-D deconvolutions $561_6$-$561_7$, on the second and third slices $511_2$-$511_3$ of the input tensor, respectively, and summing the results element-wise, at summation block $541_2$. The sixth slice $551_6$ and seventh slice $551_7$ can be produced by performing 2-D deconvolutions $561_8$-$561_9$, respectively, on the third slice $511_3$ of the input tensor. It will be appreciated that the same weights are used in deconvolutions $561_1$, $561_4$ and $561_7$ (all of which use the first slice of the kernel); deconvolutions $561_2$, $561s$ and $561_8$ (all of which use the second slice of the kernel); and deconvolutions $561_3$, $561_6$ and $561_9$ (all of which use the third slice of the kernel).

Figure 6A:
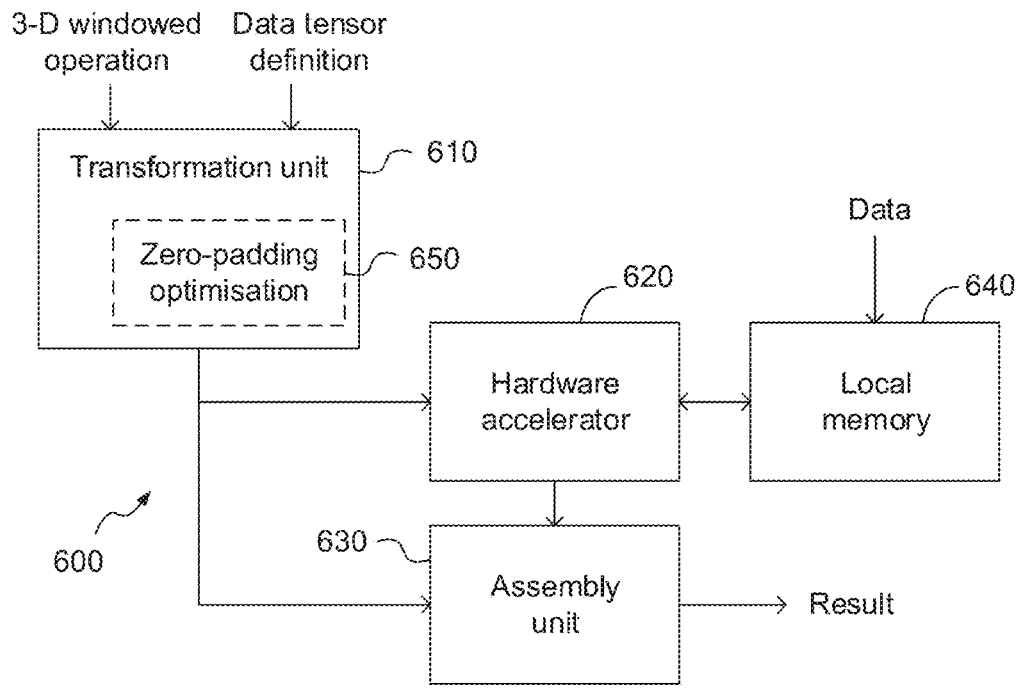
FIG. 6A is a simplified block diagram of a data processing system according to a first example.
Figure 6B:
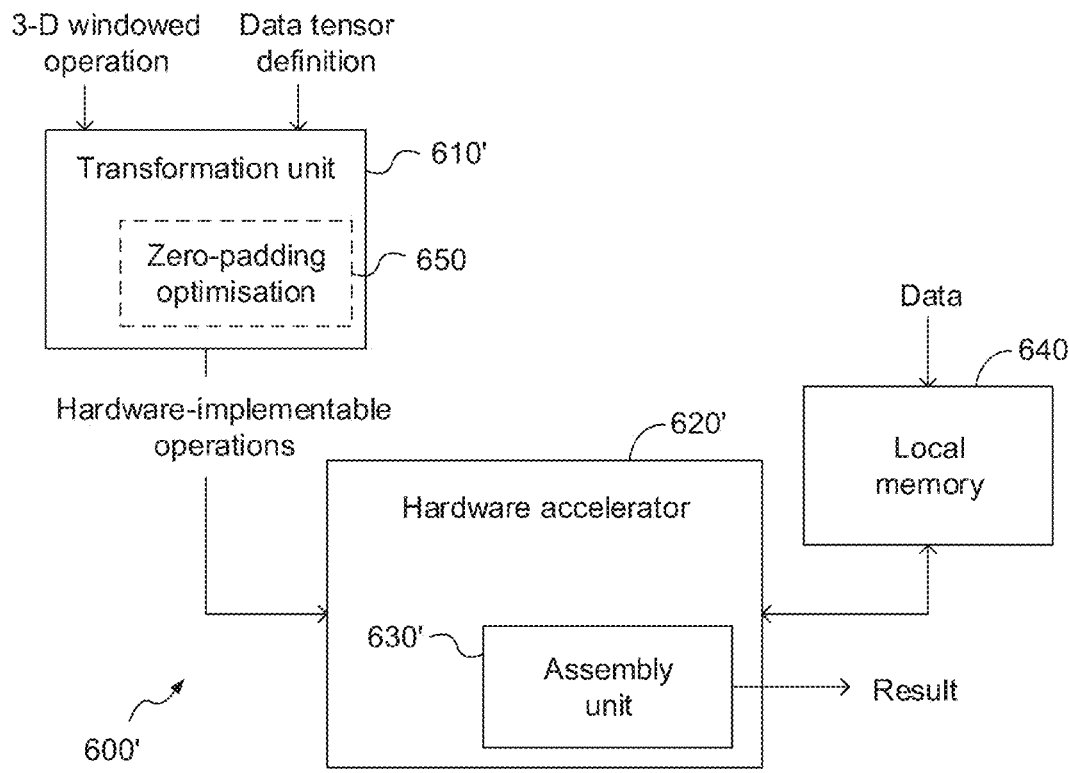
FIG. 6B is a simplified block diagram of a data processing system according to a second example.
Figure 6C:
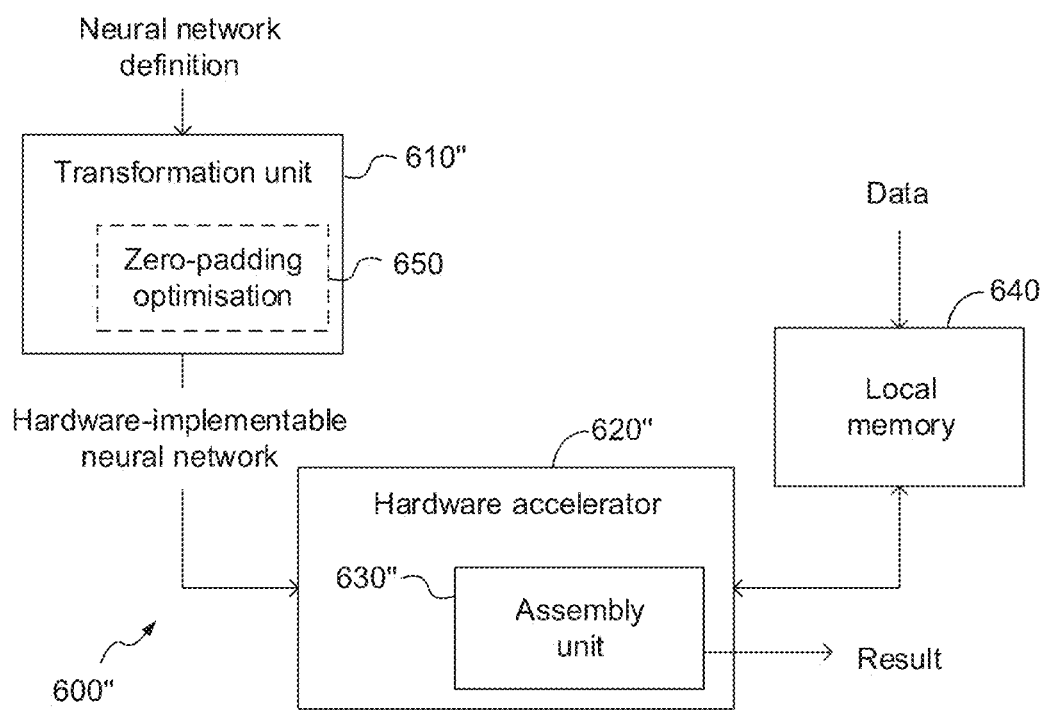
FIG. 6C is a simplified block diagram of a data processing system according to a third example.
Figure 7A:
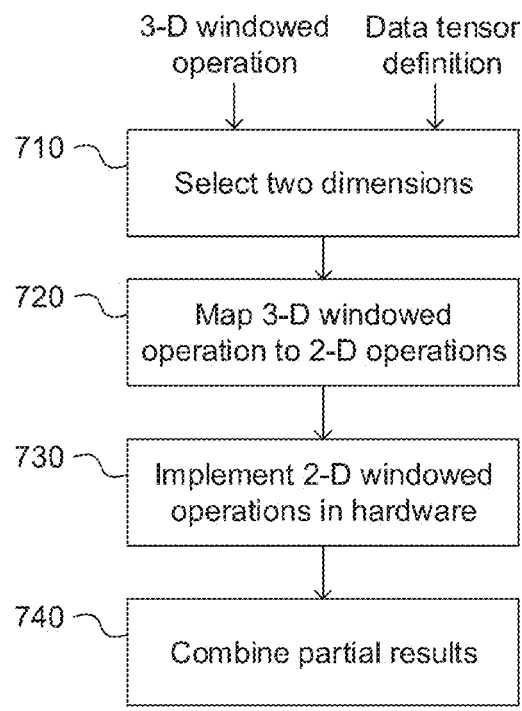
FIG. 7A is a flowchart illustrating a method of implementing a 3-D windowed operation, which may be performed by the data processing system of FIG. 6A or 6B.
Figure 7B:
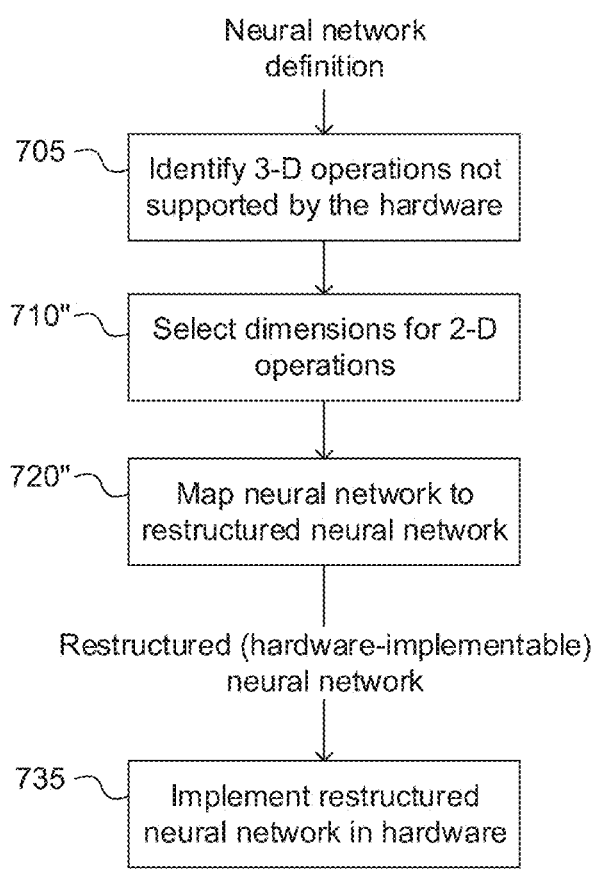
FIG. 7B is a flowchart illustrating a method of implementing a neural network, which may be performed by the data processing system of FIG. 6C.

FIGS. 6A-6C show three variants of data processing systems according to examples. FIGS. 7A-7B show flowcharts of associated methods that may be implemented by the data processing systems.

FIG. 6A is a block diagram of a data processing system 600 according to a first example. FIG. 7A shows a flowchart of a method performed by the data processing system 600, according to this example. The data processing system 600 comprises a transformation unit 610; a hardware accelerator 620; an assembly unit 630; and a memory, local memory 640. It may further comprise an optional zero padding optimisation unit 650 (shown in dashed outline), which may be comprised in the transformation unit 610. The transformation unit 610 receives a definition of a 3-D windowed operation to be performed by the data processing system 600, as well as a definition of the data tensor. The definition of the data tensor includes at least the size of the data in each dimension. In this example, the 3-D windowed operation is a 3-D convolution. In step 710, the transformation unit 610 selects two dimensions out of the three traversed dimensions of the windowed operation. The transformation unit will map the 3-D convolution to a set of 2-D convolutions in these two selected dimensions as described above with reference to FIGS. 4 and 5. The partial results from the 2-D convolutions will be assembled (in particular, combined) along the remaining, third dimension not selected in step 710. In the present example, the transformation unit 610 selects the largest two dimensions; therefore, the 3-D convolution will be unrolled along the smallest dimension into 2-D convolutions, and the combination of partial results will also be along the smallest dimension. In this way, the transformation unit 610 arranges the 3-D convolution as a relatively small number of relatively large 2-D convolutions. (Nevertheless, in other examples, the dimensions may be selected according to different rules.)

In step 720, the transformation unit 610 performs the mapping. The result of this mapping defines a set of slices of the input data, and a set of slices of the kernel. These slices extend in the selected dimensions and do not extend in the non-selected third dimension—that is, the size of each slice in the non-selected third dimension is 1. The 3-D convolution is decomposed into a set of 2-D convolutions, between the data-slices and the kernel-slices, in the manner described above with reference to FIGS. 3-5.

In this example, the data is not zero-padded and the zero-padding optimisation unit is not used. The slices of the input data are stored in the local memory 640 of the data processing system, while the respective 2-D convolutions are being performed. Likewise, the coefficients (weights) representing the slices of the kernel are stored in the local memory 640, when performing the 2-D convolution operations.

In step 730, the circuitry of the hardware accelerator 620 carries out the set of 2-D convolution operations. That is, as explained above with reference to FIGS. 3-5, the hardware accelerator 620 convolves the appropriate slices of the input tensor with the appropriate slices of the kernel. Depending on the size of the local memory, it might not be possible to fit the entirety of the input tensor and the kernel in the memory 640 at the same time. Therefore, data may be loaded (stored) to the local memory, as needed, for the 2-D convolutions currently being implemented at any given time.

The output from each 2-D convolution is a partial result. The partial results are provided by the hardware accelerator 620 to the assembly unit 630. In step 740, the assembly unit 630 assembles (in particular, combines) the partial results from the individual 2-D convolutions, to produce the final result of the 3-D convolution. Since the 3-D windowed operation is a 3-D convolution in this example, the assembly unit combines the partial results by summing them. The results of the summing are slices of the output (as described above with reference to FIGS. 4 and 5A, for example). These slices are collected to provide the output of the 3-D convolution. In some cases, the collected slices may be passed to the next layer of the neural network separately from one another. Optionally, in some cases, the slices may be concatenated into a single output tensor, by stacking the slices along the unwrapped dimension. This may be done by writing the slices to appropriate locations in the local memory 640 or the external memory—for example, to occupy a single contiguous block of memory.

There are special cases in which no summation is necessary, and the partial results from the 2-D convolutions are simply collected and optionally concatenated. This occurs when the kernel has a size of 1 in the unpacked dimension. This would arise when implementing a 3-D convolution with a 1×1×1 kernel, for example. The assembly unit 630 is configured to assemble the partial results in whatever manner is appropriate, according to the type and window-size of the 3-D windowed operation.

In the example of FIG. 6A, the assembly unit 630 is illustrated separately from the hardware accelerator 620. This may indeed be the case, in some implementations. For example, the assembly unit may be implemented in general-purpose programmable circuitry, such as a CPU. The CPU may be programmed to perform the necessary assembly operations on the partial results of the 2-D convolutions. In the example of FIG. 6A, therefore, the transformation unit 610 instructs the hardware accelerator 620 to carry out the plurality of 2-D convolution operations, and instructs the assembly unit 630 to sum, collect, and optionally concatenate the partial results produced, as needed, to produce the result of the original 3-D convolution.

It may be advantageous, in some cases, to integrate the functions of the "assembly unit" as an integral part of the hardware accelerator. This is illustrated in FIG. 6B, which is a block diagram of a data processing system 600' according to a second example. Data processing system 600' differs from data processing system 600 in that the assembly unit 620' is a part of the hardware accelerator 630'. If the hardware accelerator 630' is implemented in a neural network accelerator, at least some of the functions of the assembly unit may be performed by dedicated circuitry specialised in element-wise operations. In the present example, in which the 3-D windowed operation is a convolution, the element-wise operation is addition. In the data processing system 600', the transformation unit 610' provides the hardware accelerator 620' with a complete set of hardware-implementable operations to implement the 3-D windowed operation. In other words, the transformation unit 610' instructs the hardware accelerator 620' to perform the plurality of 2-D windowed operations and instructs it how to assemble the results of these 2-D operations (including appropriate element-wise summation, in the example of a 3-D convolution). The results of the element-wise summation are collected and output as the result of the 3-D convolution. Apart from these modifications, the method implemented by the data processing system 600' is substantially the same as that illustrated in FIG. 7A.

One or more 3-D windowed operations may be performed as part of a neural network comprising a plurality of layers. In this case, it may be advantageous for the transformation unit to process the neural network as a whole, rather than trying to separately map individual 3-D windowed operations to respective pluralities of 2-D operations. This is illustrated in FIG. 6C, which shows a block diagram of a data processing system 600" according to a third example. A method performed according to this example is illustrated in the flowchart of FIG. 7B. The system 600" is similar to the system 600' of FIG. 6B in that the assembly unit 630" is part of the hardware accelerator 620". It differs from the system 600' of FIG. 6B in that the transformation unit 610" receives, as input, a definition of a complete neural network, which may include one or more 3-D windowed operations. The definition of the neural network also incorporates a definition of the data tensors processed at each layer in the network. In step 705, the transformation unit 610" identifies any 3-D windowed operations in the neural network that are not supported by the hardware accelerator 620". Step 710" is an extension of step 710 in FIG. 7A—for each of the identified 3-D windowed operations, the transformation unit 610" selects the two dimensions that will be traversed when the 3-D operation is mapped to 2-D operations. Then, in step 720", the transformation unit 610" maps the entire neural network to a restructured neural network. This includes mapping each of the identified 3-D windowed operations to a respective plurality of 2-D windowed operations, and defining how the partial results of these 2-D windowed operations will be assembled. The 2-D windowed operations and the assembly operations are suitable for implementation by (i.e. supported by) the hardware accelerator 620"; therefore, the restructured neural network is said to be "hardware-implementable". Layers of the original neural network that do not include unsupported 3-D windowed operations may be preserved unchanged in the restructured neural network. In step 735, the hardware accelerator 620" implements the restructured neural network. This includes, for each of the identified 3-D windowed operations, implementing the respective plurality of constituent 2-D windowed operations, and assembling the results of these 2-D windowed operations. The assembling is done using the assembly unit 630", which is again implemented within the hardware accelerator 620".

Zero-padding optimisation may also be performed in this example. In general, it may be necessary to perform zero-padding at several layers within a neural network; therefore, the zero-padding would be performed not only on the input data tensor, but also on tensors representing the output of intermediate layers. This may be done by the hardware accelerator 620", acting under the control of the transformation unit 610".

Figure 8:
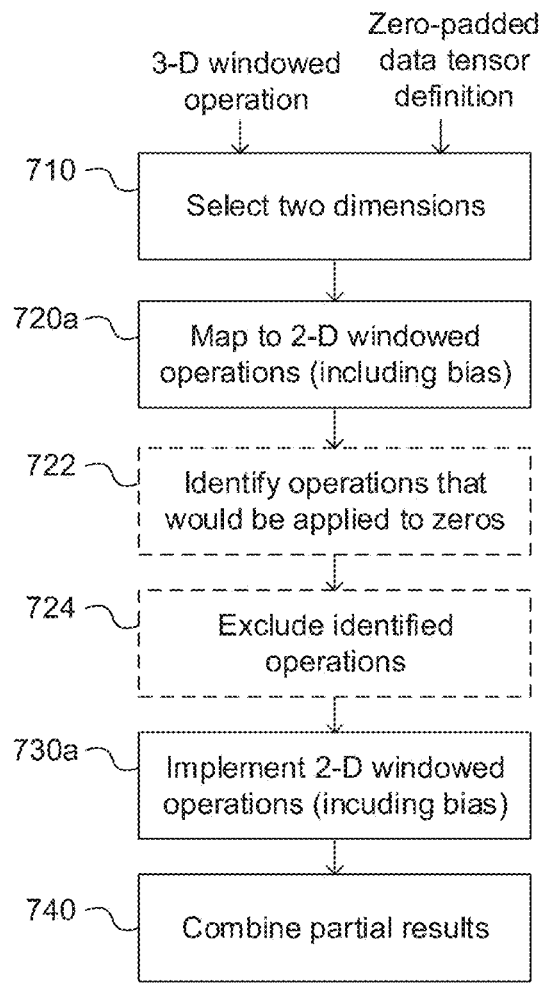
FIG. 8 is a flowchart illustrating a method of implementing a 3-D windowed operation according to another example.

FIG. 8 illustrates a flowchart extending the method of FIG. 7A performed by the data processing systems 600 and 600'. It will be understood that the method of FIG. 7B, performed by the data processing system 600", can be extended similarly. According to the method of FIG. 8, optional bias addition will be included. Bias addition is often performed in conjunction with convolution. Optional zero-padding optimisation will also be performed in the method of FIG. 8. The steps associated with the optional zero-padding optimisation are shown in dashed outline, in FIG. 8.

Zero-padding of tensors in neural networks is commonly done so that the output of a layer has the same dimensions as the input to that layer (subject to stride). This principle applies equally to higher dimensional windowed operations, such as the 3-D convolution operations of the present examples. In the example of FIG. 8, it is assumed that the data is zero-padded before storing it in the local memory 640. This includes zero-padding at the edges of the data in each of the traversed dimensions. When the data is subsequently structured in slices, this will mean that there are slices that consist exclusively of zeros. Any convolution with an array of zeros will yield zeros as its result, because convolution involves multiplying the inputs by the weights (coefficients). These zeros will have no influence on the final result, because the partial results are combined by adding (and adding zero to anything has no effect). Based on this recognition, in the present embodiment, these unnecessary convolution operations will be omitted.

Step 710 is identical to the corresponding step in FIG. 7A. In step 720a, the transformation unit 610 maps the 3-D convolution operation to a set of 2-D convolution operations (in the selected two dimensions), this time including bias addition operations as described above with reference to FIG. 5A. In step 722, the zero-padding optimisation unit 650 identifies 2-D convolutions that would operate entirely on zeros as a result of the zero-padding. In step 724, the zero-padding optimisation unit 650 excludes the identified, unnecessary 2-D convolutions from the operations to be performed by the hardware accelerator. In other words, these operations are not performed, when the 2-D operations are implemented by the hardware accelerator 620 in step 730a. This omission of unnecessary operations can save computation time, memory, bandwidth and power.

Since the slices consisting exclusively of zero-padding are not actually used in the 2-D windowed operations, it may not be necessary to store them in the local memory 640. This can result in more efficient use of memory capacity, by omitting redundant data as well as the redundant operations that have been excluded.

In the example of FIG. 8, it is assumed that the data is already zero-padded when it is stored in the local memory 640. However, this is not essential. In other examples, the data may be stored in the local memory 640 without padding, and the zero-padding may be added on the fly by the hardware accelerator 620, at the time when it is implementing the plurality of 2-D windowed operations (step 730/730a). In this case, too, the hardware accelerator 620 need not instantiate slices of data that consist exclusively of zero-padding. In other words, the hardware accelerator 620 may add zero padding only in the two dimensions selected in step 710, and not in the non-selected dimension(s).

Figure 9:
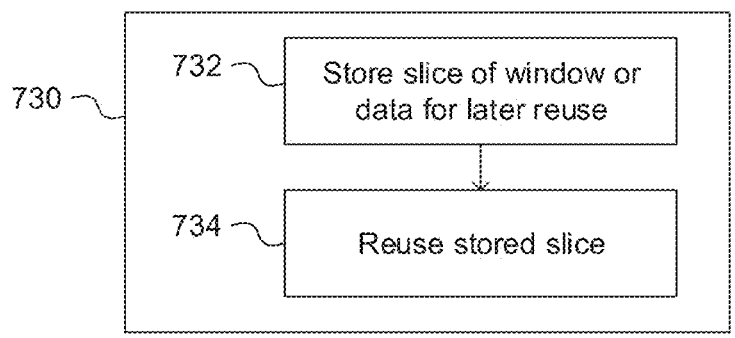
FIG. 9 illustrates a process of storing and reusing part of a kernel or data.

FIG. 9 illustrates step 730 in greater detail. In particular, the process illustrated in FIG. 9 can be used to improve the efficiency of memory bandwidth usage when the hardware accelerator 620 is carrying out the 2-D convolution operations. This can be applied to both step 730 as shown in FIG. 7A and step 730 as shown in FIG. 8, as well as to step 735 in FIG. 7B. The enhancement follows from the recognition that data and kernel weights are reused to some extent, when implementing the set of 2-D convolutions. This can be seen most easily in FIG. 4 and FIG. 5A. As mentioned previously, each slice of the kernel is used in two separate 2-D convolutions in these examples. The weights in the 2-D convolution $560_1$ are identical to the weights in the 2-D convolution $560_4$. In both cases, these are the weights from the first slice of the kernel. Likewise, the weights in the 2-D convolution $560_2$ are identical to the weights in the 2-D convolution $560_5$ (the second slice of the kernel); and the weights in the 2-D convolution $560_3$ are identical to the weights in the 2-D convolution $560_6$ (the third slice of the kernel). It can also be seen that the third slice $510_3$ of the input tensor is used twice, in 2-D convolutions $560_3$ and $560_4$.

In a naïve implementation, this pattern of reuse would be ignored—the relevant slices of the data and kernel would be loaded from external memory and stored in the local memory 640 each time they are needed for a 2-D convolution. However, according to the present example, either the data or the weights, or both, may be stored once in the local memory 640 and used at least twice for two different 2-D convolutions. In effect, this allows caching of the data and/or weights between different ones of the plurality of 2-D convolutions. This is reflected in the steps 732 and 734 performed by the data processing system when implementing the 2-D convolutions in the hardware accelerator 620. In step 732, the system stores (at least part of) a slice of the kernel or (at least part of) a slice of the data in the local memory 640, for later reuse in a subsequent 2-D convolution operation. In step 734, the hardware accelerator 620 reuses the stored slice in the subsequent 2-D convolution operation. Thus, for example, the weights (that is, the first slice of the kernel) used for the convolution $560_1$ may be stored in the local memory and remain there until the hardware accelerator 620 performs convolution $560_4$, when they are reused. Alternatively or in addition, at least a part of the third slice of the input tensor $510_3$ may be stored in the local memory 640 and may remain there after the convolution $560_3$ has completed. This (at least partial) slice of the input tensor may then be reused, without requiring a further read from external memory, when the convolution $560_4$ is performed.

The quantity of data stored and reused may depend on the capacity of the local memory 640.

The transformation unit 610 may be configured to sequence the set of 2-D convolution operations so as to increase the reuse of data and coefficients stored in the local memory 640. For example, the transformation unit 610 may instruct the hardware accelerator 620 to perform convolution $560_5$ immediately after convolution $560_2$, because this will allow the stored weights to be reused between these successive convolutions.

The examples above have focused on 3-D convolution operations as the windowed operation. However, the present disclosure is neither limited to 3-D windowed operations nor to convolution operations. Any windowed operation whose underlying mathematical operation has the properties of being associative and commutative can be decomposed/unrolled into a plurality of equivalent 2-D windowed operations, in a similar manner to the 3-D convolutions discussed above. It will be understood that the step of assembling the partial results should be chosen according to the windowed operation being implemented. The assembling may comprise combining partial results (as in step 740) and/or collecting or concatenating them. The combination 740 is based on element-wise summation, when implementing a convolution operation. For a 3-D max-pooling operation, the combination will be based on an element-wise maximum operator (that is, returning the maximum of the partial results). Similarly, for a 3-D min-pooling operation, the combination will be based on an element-wise minimum operator. Other windowed operations may be performed based on those already mentioned. For example, a mean pooling operation can be implemented by means of a convolution operation.

In the examples described above, the original windowed operation to be performed was a 3-D windowed operation, and this was unrolled over one dimension into a plurality of 2-D windowed operations. The same strategy can be applied to higher dimensional windowed operations. For example, a 4-D windowed operation could be unrolled over two dimensions into a plurality of 2-D windowed operations. In this way, higher dimensional windowed operations in any number of dimensions can be reduced to a set of 2-D windowed operations, which it is possible to implement efficiently using a hardware accelerator for 2-D windowed operations.

The data processing systems 600, 600', 600" can thus be used to implement 3-D (and higher dimensional) operations efficiently, as well as traditional 2-D operations. Moreover, a system that is optimised for 2-D windowed operations can be used in this way, either without modification or with minimal modification, to implement 3-D and higher dimensional windowed operations efficiently. It will be understood that, where dimensions are listed in the foregoing description (for example, a 4-D tensor denoted "[B, C, H, W]") the ordering of the dimensions generally has no special significance. The dimensions may be ordered in the tensor differently in different implementations.

A hardware accelerator that is suitable for efficient implementation of 2-D windowed operations (especially 2-D convolution operations) will now be described.

Figure 10:
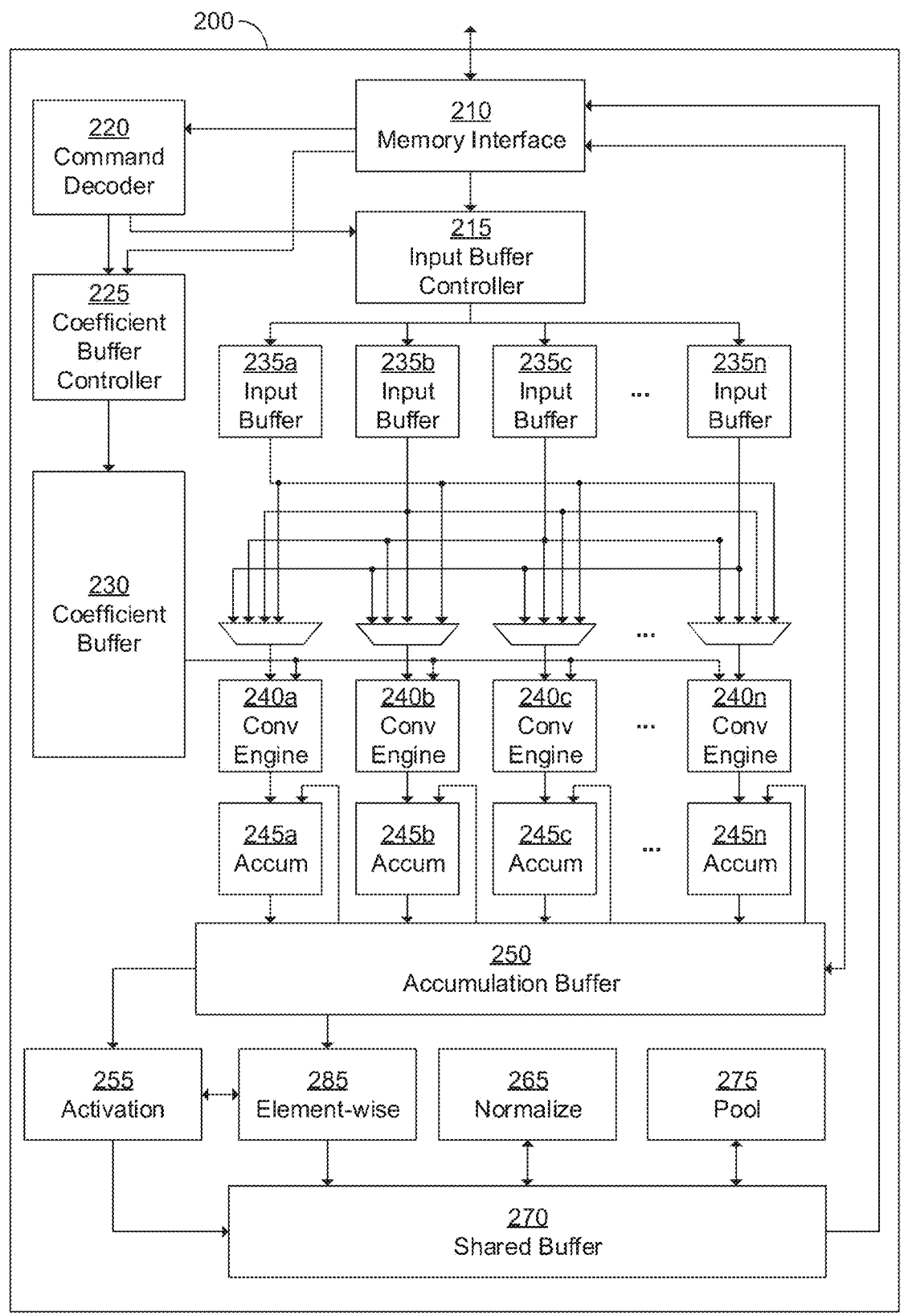
FIG. 10 is a block diagram of a hardware accelerator for implementing a convolutional neural network, according to an example.

FIG. 10 illustrates a hardware accelerator 200 that is configured to implement a CNN. The hardware accelerator comprises digital logic circuitry that is configured to receive data (including weights and input tensors) and commands for processing them. The hardware accelerator 200 comprises a memory interface 210, an input buffer controller 215, a command decoder 220, a coefficient buffer controller 225, a coefficient buffer 230, n input buffers 235, n convolution engines 240, n accumulators 245, an activation module 255, a normalize module 265, a shared buffer 270, a pool module 275, and an element-wise operations module 285. The hardware accelerator 200 can be used to implement 2-D operations and assemble their partial results, according to examples. In particular, it is suitable for providing the hardware accelerator 620' or 620" in FIG. 6B or 6C. In this case, the "local memory" 640 of FIGS. 6B and 6C is provided, collectively, by the coefficient buffer 230, input buffers 235, the accumulation buffer 250 and the shared buffer 270 in FIG. 10.

The memory interface 210 is configured to provide an interface between the hardware accelerator 200 and external memory (not shown). The external memory may be considered as a separate module to the hardware accelerator 200. The command or configuration data may, for example, comprise information regarding weight and data size and format as well as their location in the external memory.

The memory interface 210 is configured to receive, from external memory, weights and data to be used in calculations within the CNN, as well as command information to control the operation of the hardware accelerator 200. The received weights (also referred to herein as coefficients) are passed to the coefficient buffer controller 225 and the received data is passed to the input buffer controller 215. The received commands are passed to the command decoder 220, which, in turn, is configured to decode the commands and subsequently issue control information to elements of the hardware accelerator, including the coefficient control buffer controller 225 and input buffer controller 215 to control the manner in which the weight and input data is stored in the buffers.

The weights and input data received from external memory via memory interface 210 during a read of the external memory may form the weights and input data for only a portion of a single layer, all of the weights and input data to be used in processing a single layer, or may comprise the weights and input data for processing multiple layers. For example, the weights received from external memory may form the weights of a single layer and the input data received may form only a portion of the input data for a single layer (or vice versa). Any combination of data and weights across one or more layers may be received from external memory in a single read from the memory (for example using a burst read).

In practice, the number of weights and data received in a single read from external memory will depend upon the size of the coefficient buffer 230 and the input buffer 235. The weights are passed from the coefficient buffer controller 225 to the coefficient buffer 230 and the data received is passed from the input buffer controller 215 to a plurality of input buffers 235a-235n. The number of input buffers will depend upon the specific implementation of the accelerator 200 but may take any value. The input data is shared across all of the input buffers 235a-235n. The input buffers each form an effective bank such that the number of input buffers can be increased or decreased depending on the application.

Figure 11:
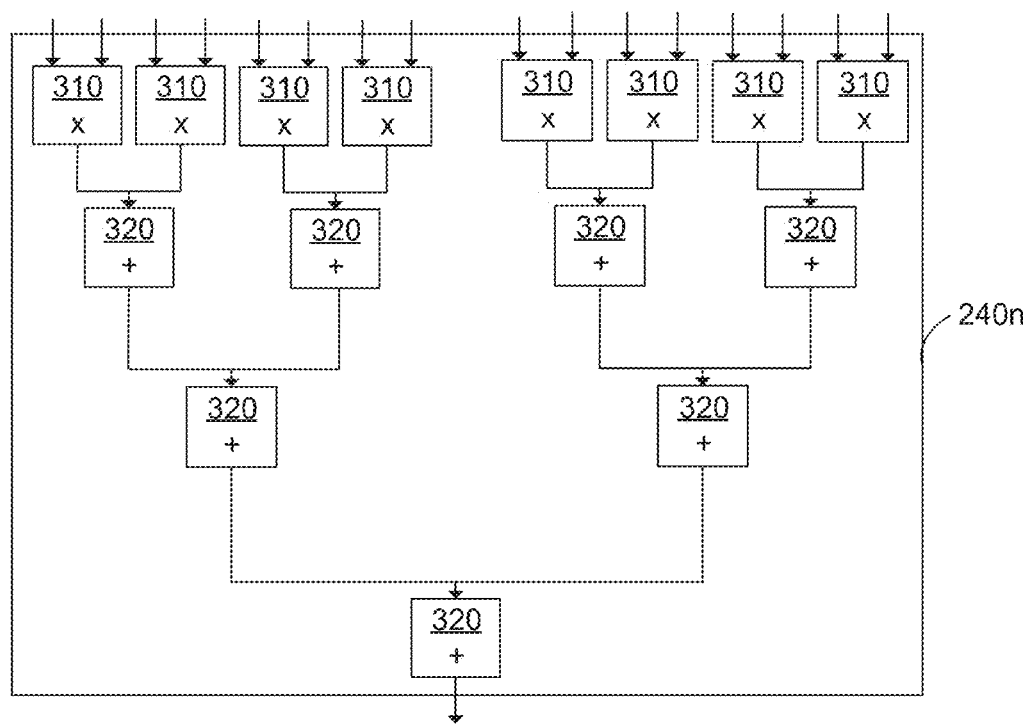
FIG. 11 shows an example of a convolution engine illustrated in FIG. 10.

The input buffers 235a-235n are connected to each of a plurality of multiplexers since each convolution engine 240a-240n requires access to all of effective 'banks' of the input data. The multiplexers are each configured to select an output from one of the input buffers and to pass the values output from the selected input buffer to a respective convolution engine 240a-240n. In addition, weights from the coefficient buffer 230 are provided as a second input into each convolution engine 240a-240n. The convolution engines are configured to perform a convolution calculation on the received input data using the weights received from the coefficient buffer 230. The resultant output of each convolution engine 240a-240n is provided as an input to a respective accumulator of a plurality of accumulators 245a-245n. An example implementation of a convolution engine 240n is illustrated in FIG. 11, which comprises a plurality of elements of multiply logic 310 and a plurality of elements of addition logic 320.

Each accumulator 245a-245n is connected to an accumulation buffer 250. The accumulation buffer 250 is configured to store accumulated results received from each accumulator 245a-245n. The accumulation buffer 250 is connected to the memory interface 210. As such, the accumulation buffer 250 is configured to send and receive data to and from external memory via memory interface 210. Specifically, the accumulation buffer 250 is configured to be able to store and restore its values from the external memory via memory interface 210, as will be described in more detail below. The accumulation buffer 250 is connected to the input of the accumulators 245a-245n and is configured to feed values back into the accumulators 245a-245n to enable accumulation calculations to take place.

The accumulation buffer 250 is configured to pass accumulated values to the activation module 255. The activation module 255 is configured to perform at least one of a number of different activation functions. In some implementations, the activation module 255 may be configured to operate as a Rectified Linear Unit (ReLU).

The resultant value calculated by the activation module 255 is passed to be processed by the normalize module 265 via the shared buffer 270. The normalize module 265 is configured to perform one of a number of different normalizing functions. A Local Response Normalisation Layer function may be performed within the same plane of input data. The Local Response Normalisation Layer function may also be performed across planes.

The normalize module 265 may be configured to implement one or more of the above described normalisation functions. Specifically, the normalize module 265 may be configurable such that it is capable of performing any of the above three functions, and any other suitable functions. In this way, the normalize module 265 may receive signalling to indicate which function the normalize module is to perform. This may be performed using one of a number of pre-defined functions such that the control signalling received by the normalize function indicates which of the pre-defined functions the normalize module 265 should perform.

A result stored in the shared buffer 270 is passed to the memory interface 210, which can either store the result in external memory or pass the result back into the input buffers for further processing without having to first be passed out to external memory.

The shared buffer 270 is configured for two purposes, namely to buffer values from the activation module 255 until the correct samples are available to perform normalisation and/or to buffer the values from the normalisation unit the correct samples are available to perform pooling. In this way, a shared buffer is used for efficiency of storage since, in many implementations, the normalisation and pooling are not combined in the same process.

The element-wise operations module 285 comprises circuitry configured to perform element-wise operations on tensors received from the accumulation buffer 250 and/or activation module 255. The supported element-wise operations include element-wise addition, multiplication, and maximum (or minimum) of the respective elements of the tensors.

Whilst the hardware accelerator of FIG. 10 illustrates a particular order in which the modules are arranged and thus how the processing of data flows through the hardware implementation, it will be appreciated that the specific calculations required and the order in which data is processed across layers may vary.

In some layers, the functions performed by the activation 255, normalize 265, pool 275, and element-wise 285 modules may be performed. In other layers, only one of these functions may be performed and not necessarily in the order set out in the hardware accelerator 200. To achieve a configurable order of processing these functions, each of the activation 255, normalize 265, pool 275 and element-wise 285 modules may be configured to receive control signalling configuring the module into a bypass mode in which the function is not performed and the input values are simply passed through the modules without change.

In some layers, the data of a particular layer may need to be processed first by the convolution engines 240a-n and then second according to the activation, normalize, pool, and element-wise modules 255, 265, 275, 285. In these layers, the output from the convolution engines 240a-n are passed via the accumulators 245a-n to the accumulation buffer 250 and are then passed to activation, normalize, pool, and element-wise modules 255, 265, 275, 285 for further processing. In other layers, the data may need to be processed differently. For example, data may need to be processed first according to the activation, normalize, pool, and element-wise modules 255, 265, 275, 285 and second according to the convolution engines 240a-n.

In these arrangements, data can be passed directly to the activation module via the accumulation buffer 250, where the accumulation buffer 250 has received the input data directly from the memory interface 210 which has received the data from external memory. In this way, the processing performed by convolution engines 240a-n and accumulator 245a-n is effectively skipped and the data can be passed directly to the activation 255, normalize 265, pool 275, and element-wise 285 modules. Then, once processing using activation, normalize, pool, and element-wise modules 255, 265, 275, 285 is completed, the resultant values can be passed into the input buffer controller 215 via the memory interface 210. In some arrangements, the resultant values can be first passed to external memory via memory interface 210 and then retrieved from external memory before use.

In other arrangements, the memory interface 210 may pass the resultant values to the input buffer controller 215 without passing the values to external memory. By avoiding the need to pass the values resulting from calculations using the activation, normalize, pool, and element-wise modules 255, 265, 275, 285 to external memory, memory bandwidth is reduced and therefore the latency in processing the data is also reduced.

By providing the above-described features, it is possible for the hardware accelerator 200 to handle a variety of different configurations of CNNs by providing the capability for memory-to-memory calculations to be performed. These memory-to-memory calculations do not need to be directly correlated with a particular layer. Put another way, the hardware implementation 200 is adaptable to the specific CNN that is to be implemented. Advantageously, since the activation, normalize, pool, and element-wise modules 255, 265, 275, 285 are placed linearly, it is possible to perform these functions back-to-back without having to retrieve data from external memory.

In some implementations, the order in which the activation, normalize, pool, and element-wise modules 255, 265, 275, 285 are connected may vary. For example, the activation, normalize, and pool modules 255, 265, 275 may be connected in reverse order such that the pool module is connected to the accumulation buffer 250 and the activation module is connected to the memory interface 210.

As explained already above, the hardware accelerator 200 can be employed over multiple passes to efficiently implement a plurality of constituent 2-D windowed operations, making up a windowed operation in a larger number of dimensions. The hardware accelerator 200 can also be employed to assemble (for example, combine) the partial results of the constituent 2-D windowed operations. In this context, the convolution engines 240 and accumulators 245 can be used to implement 2-D convolutions; the pool module 275 can be used to implement 2-D max-pooling, min-pooling or mean-pooling. The element-wise operations module 285 can be used to combine partial results from these 2-D operations.

For example, if the original 3-D operation was a mean-pooling operation, this may be mapped by the transformation unit 610' or 610" to a plurality of constituent 2-D mean-pooling operations, which are performed by the pool module 275. The partial results produced by these 2-D mean-pooling operations are combined by calculating their mean. This can be done by the element-wise operations module 285, with an element-wise add and an element-wise multiply by a scalar, to implement the mean.

Figure 12:
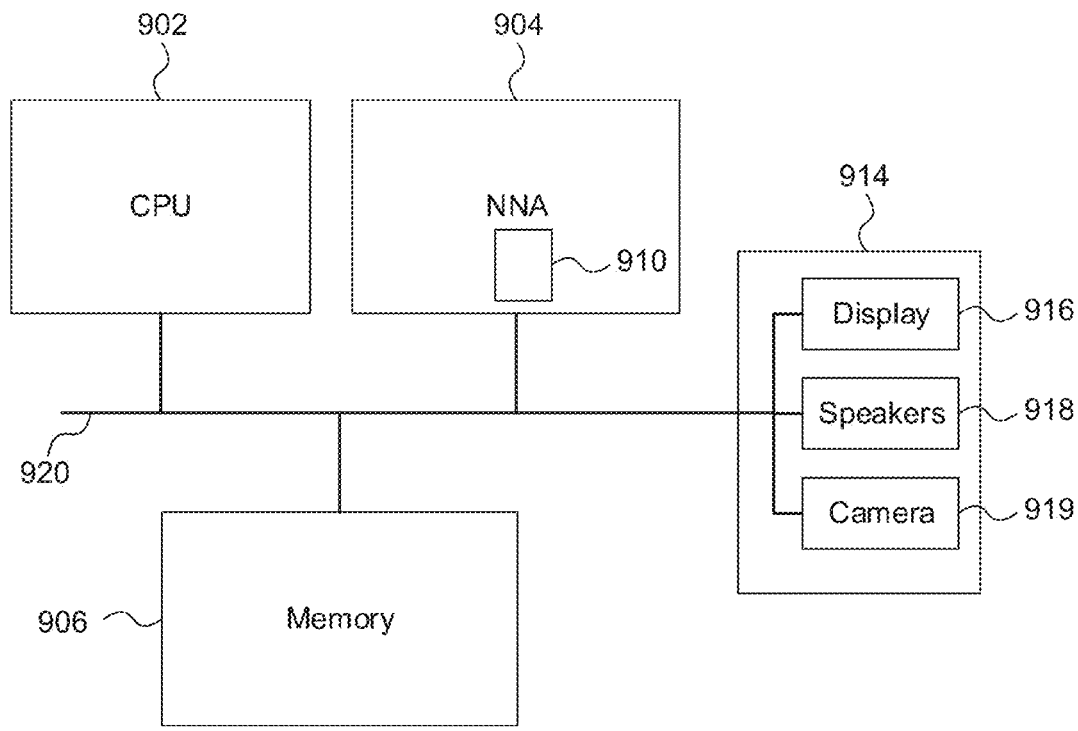
FIG. 12 shows a computer system in which a data processing system is implemented.

FIG. 12 shows a computer system in which the data processing systems described herein may be implemented. The computer system comprises a CPU 902, a NNA 904, a memory 906 and other devices 914, such as a display 916, speakers 918 and a camera 919. A processing block 910 (corresponding to data processing system 600, 600', 600") is implemented on the NNA 904. In other examples, the processing block 910 may be implemented on the CPU 902. The components of the computer system can communicate with each other via a communications bus 920. The memory 906 can provide the "external memory" referred to previously.

The data processing system 600, 600', 600" of FIG. 6A-C is shown as comprising a number of functional blocks. This is schematic only and is not intended to define a strict division between different logic elements of such entities. Each functional block may be provided in any suitable manner. It is to be understood that intermediate values described herein as being formed by a data processing system need not be physically generated by the data processing system at any point and may merely represent logical values which conveniently describe the processing performed by the data processing system between its input and output.

The data processing systems described herein may be embodied in hardware on an integrated circuit. The data processing systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java® or OpenCL®. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a data processing system or NNA configured to perform any of the methods described herein, or to manufacture a data processing system or NNA comprising any apparatus described herein. An integrated circuit definition dataset may be, for example, an integrated circuit description.

Therefore, there may be provided a method of manufacturing, at an integrated circuit manufacturing system, a data processing system or NNA as described herein. Furthermore, there may be provided an integrated circuit definition dataset that, when processed in an integrated circuit manufacturing system, causes the method of manufacturing a data processing system or NNA to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS (RTM) and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a data processing system according to an example will now be described with respect to FIG. 13.

Figure 13:
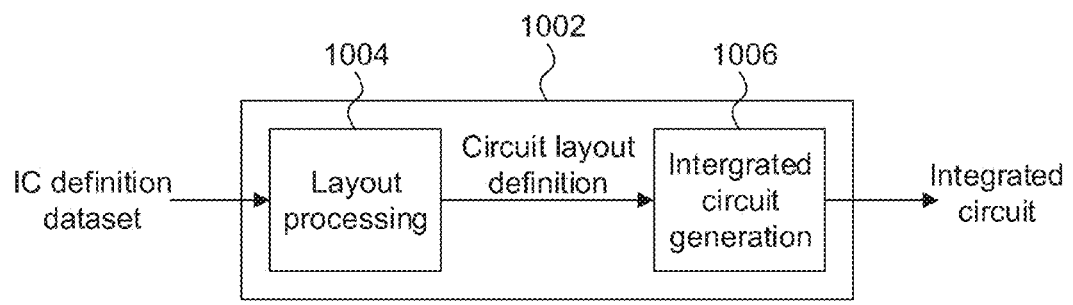
FIG. 13 shows an integrated circuit manufacturing system for generating an integrated circuit embodying a data processing system.

FIG. 13 shows an example of an integrated circuit (IC) manufacturing system 1002 which is configured to manufacture a data processing system as described in any of the examples herein. In particular, the IC manufacturing system 1002 comprises a layout processing system 1004 and an integrated circuit generation system 1006. The IC manufacturing system 1002 is configured to receive an IC definition dataset (e.g. defining a data processing system as described in any of the examples herein), process the IC definition dataset, and generate an IC according to the IC definition dataset (e.g. which embodies a data processing system as described in any of the examples herein). The processing of the IC definition dataset configures the IC manufacturing system 1002 to manufacture an integrated circuit embodying a data processing system as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 13 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 13, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of implementing a windowed operation in at least three traversed dimensions, the windowed operation comprising applying a window having at least three dimensions to data having at least three traversed dimensions, with shifts of the window in all three traversed dimensions, the method comprising:
    selecting two dimensions of the at least three traversed dimensions;
    mapping the windowed operation to a plurality of constituent 2-D windowed operations in the selected two dimensions, each 2-D windowed operation comprising applying a slice of the window to a slice of the data, with shifts of the slice of the window in only two dimensions;
    implementing each of the plurality of 2-D windowed operations by at least one hardware accelerator, each 2-D windowed operation producing a respective partial result; and
    assembling the partial results to produce the result of the windowed operation, wherein the windowed operation is implemented as part of a neural network;
    wherein the neural network comprises a plurality of layers, wherein the windowed operation in at least three traversed dimensions is a first windowed operation forming one layer of said neural network, the plurality of constituent 2-D windowed operations is a first plurality of constituent 2-D windowed operations, and the partial results are first partial results,
    the neural network comprising another layer comprising a second windowed operation in at least three traversed dimensions,
    the method further comprising:
    mapping the neural network to a restructured neural network, wherein the first windowed operation is mapped to the first plurality of constituent 2-D windowed operations and the second windowed operation is mapped to a second plurality of constituent 2-D windowed operations; and
    implementing the second plurality of constituent 2-D windowed operations by the at least one hardware accelerator;
    wherein mapping the neural network to the restructured neural network comprises:
    identifying that the first windowed operation and the second windowed operation are not supported by the at least one hardware accelerator, and
    in response, mapping them respectively to the first plurality and the second plurality of constituent 2-D windowed operations.

2. The method of claim 1, wherein the data comprises zero-padded data, and wherein mapping the windowed operation to the plurality of constituent 2-D windowed operations comprises:
    excluding from the plurality of constituent 2-D windowed operations a 2-D windowed operation that would be applied to a slice of the zero-padded data that consists solely of zeros.

3. The method of claim 1, further comprising, when implementing one of the plurality of 2-D windowed operations in the at least one hardware accelerator, storing at least a part of the slice of the data or at least a part of the slice of the window in a local memory of the at least one hardware accelerator, and
    when subsequently implementing another one of the plurality of 2-D windowed operations in the at least one hardware accelerator, reusing the stored part.

4. The method of claim 1, wherein the windowed operation is one of:
    a convolution operation, wherein each of the 2-D windowed operations is a 2-D convolution operation, and wherein assembling the partial results comprises combining them by summing the partial results;
    a maximum operation, wherein each of the 2-D windowed operations is a maximum operation, and wherein assembling the partial results comprises combining them by identifying the maximum among the partial results;
    a minimum operation, wherein each of the 2-D windowed operations is a minimum operation, and wherein assembling the partial results comprises combining them by identifying the minimum among the partial results; and
    a mean pooling operation, wherein each of the 2-D windowed operations is a mean pooling operation, and wherein assembling the partial results comprises combining them by calculating the mean of the partial results.

5. The method of claim 1, wherein the windowed operation includes a bias addition, wherein mapping the windowed operation to the plurality of constituent 2-D windowed operations comprises mapping the bias addition to a selected one of the 2-D windowed operations, wherein the bias addition is performed in the at least one hardware accelerator as part of the selected 2-D windowed operation (730a).

6. The method of claim 1, wherein the data comprises one of the following, or a derivative thereof:
    video data comprising two spatial dimensions and one temporal dimension; and
    volumetric data, comprising three spatial dimensions.

7. A non-transitory computer readable storage medium having stored thereon computer readable code configured to cause the method of claim 1 to be performed when the code is run.

8. The method of claim 1, wherein the selected two dimensions are the two dimensions of the at least three traversed dimensions with the largest number of shifts of the window.

9. A data processing system for implementing a windowed operation in at least three traversed dimensions, the windowed operation comprising applying a window having at least three dimensions to data having at least three traversed dimensions, with shifts of the window in all three traversed dimensions, the data processing system comprising:
    a transformation unit, configured to select two dimensions of the at least three traversed dimensions and map the windowed operation to a plurality of constituent 2-D windowed operations in the selected two dimensions, each 2-D windowed operation comprising applying a slice of the window to a slice of the data, with shifts of the slice of the window in only two dimensions;
    at least one hardware accelerator, comprising circuitry configured to implement the plurality of 2-D windowed operations, each 2-D windowed operation producing a respective partial result; and
    an assembly unit, configured to assemble the partial results to produce the result of the windowed operation,
    wherein the windowed operation is implemented as part of a neural network;
    wherein the neural network comprises a plurality of layers, wherein the windowed operation in at least three traversed dimensions is a first windowed operation forming one layer of said neural network, the plurality of constituent 2-D windowed operations is a first plurality of constituent 2-D windowed operations, and the partial results are first partial results;

the neural network comprising another layer comprising a second windowed operation in at least three traversed dimensions;

wherein the transformation unit is configured to map the neural network to a restructured neural network, wherein the first windowed operation is mapped to the first plurality of constituent 2-D windowed operations and the second windowed operation is mapped to a second plurality of constituent 2-D windowed operations, wherein the at least one hardware accelerator is further configured to implement the second plurality of constituent 2-D windowed operations;

wherein the transformation unit is configured to, when mapping the neural network to the restructured neural network, identify that the first windowed operation and the second windowed operation are not supported by the at least one hardware accelerator; and in response, map them respectively to the first plurality and the second plurality of constituent 2-D windowed operations.

10. The data processing system of claim 9, wherein the at least one hardware accelerator comprises any one, or any combination of two or more of:

one or more convolution engines, comprising circuitry configured to perform convolution calculations;

a pooling unit, comprising circuitry configured to perform a pooling operation;

an element-wise operations module, comprising circuitry configured to perform element-wise operations on the elements of two or more tensors;

the assembly unit; and an activation unit, comprising circuitry configured to implement an activation function of a neural network layer.

11. The data processing system of claim 9, wherein each of the second plurality of constituent 2-D windowed operations produces a respective second partial result, wherein the assembly unit is configured to assemble the second partial results to produce the result of the second windowed operation.

12. The data processing system of claim 9, wherein the first windowed operation and the second windowed operation are arranged in consecutive layers of the neural network, and wherein each first partial result forms a slice of data that is input to a respective one of the second plurality of windowed operations.

13. The data processing system of claim 9, further comprising a zero-padding optimisation unit, and wherein the data comprises zero-padded data, wherein the zero-padding optimisation unit is configured to exclude from the plurality of constituent 2-D windowed operations a 2-D windowed operation that would be applied to a slice of the zero-padded data that consists solely of zeros.

14. A non-transitory computer readable medium having stored thereon an integrated circuit definition dataset that, when processed in an integrated circuit manufacturing system, configures the integrated circuit manufacturing system to manufacture a data processing system as set forth in claim 9.

15. A non-transitory computer readable storage medium having stored thereon a computer readable dataset description of a data processing system or Neural Network Accelerator (NNA) as claimed in claim 9 that, when processed in an integrated circuit manufacturing system, causes the integrated circuit manufacturing system to manufacture an integrated circuit embodying the data processing system.

16. An integrated circuit manufacturing system configured to manufacture a data processing system as set forth in claim 9.

* * * * *